(12) United States Patent
Melendez et al.

(10) Patent No.: US 10,237,393 B1
(45) Date of Patent: Mar. 19, 2019

(54) SAFETY SYSTEMS AND METHODS THAT USE PORTABLE ELECTRONIC DEVICES TO MONITOR THE PERSONAL SAFETY OF A USER

(71) Applicant: Intel Corporation, Santa Clara, CA (US)

(72) Inventors: Olivia Melendez, Sacramento, CA (US); Yuri Krimon, Folsom, CA (US); Yoganand Gandlur, Eldorado Hills, CA (US); Rathish Jayabharathi, Folsom, CA (US); Handeep Kaur, Mather, CA (US); Daisy Rincon, San Jose, CA (US); Jorge L. Rojas, Redwood City, CA (US); Rahul Sharma, Folsom, CA (US); Shidi Wang, San Jose, CA (US); Yan Mui Kitty Yeung, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/702,456

(22) Filed: Sep. 12, 2017

(51) Int. Cl.
*H04W 12/06* (2009.01)
*H04M 1/725* (2006.01)
*H04W 4/02* (2018.01)

(52) U.S. Cl.
CPC ... *H04M 1/72538* (2013.01); *H04M 1/72541* (2013.01); *H04M 1/72569* (2013.01); *H04W 4/023* (2013.01)

(58) Field of Classification Search
CPC ..... H04M 1/7258; H04W 12/06; G06N 7/005
See application file for complete search history.

(56) References Cited

U.S. PATENT DOCUMENTS

2016/0345171 A1* 11/2016 Kulkarni ................. H04L 63/18
2017/0372216 A1* 12/2017 Awiszus ................. G06N 7/005

OTHER PUBLICATIONS

Companion, <https://www.companionapp.io>, last retrieved on Sep. 5, 2017 (3 pages).

* cited by examiner

Primary Examiner — Myron Wyche
(74) Attorney, Agent, or Firm — Hanley, Flight & Zimmerman, LLC

(57) ABSTRACT

Methods, apparatus, systems and articles of manufacture to monitor the personal safety of a user of a portable electronic device are disclosed. The safety monitor includes a usage context analyzer to determine a usage context in which the portable electronic device is used based on a history of past usage information. The safety monitor also includes a current usage detector, a threshold alert level monitor, and a safety alert actuator. The current usage detector determines whether the portable electronic device is being used in the usage context at a current time, and, if so, obtains a corresponding threshold alert level that indicates a degree of danger to which a user of the portable electronic device is exposed. The threshold alert level monitor determines whether the threshold alert level has been satisfied, and, if so, the safety alert actuator actuates an output device of the portable electronic device.

25 Claims, 13 Drawing Sheets

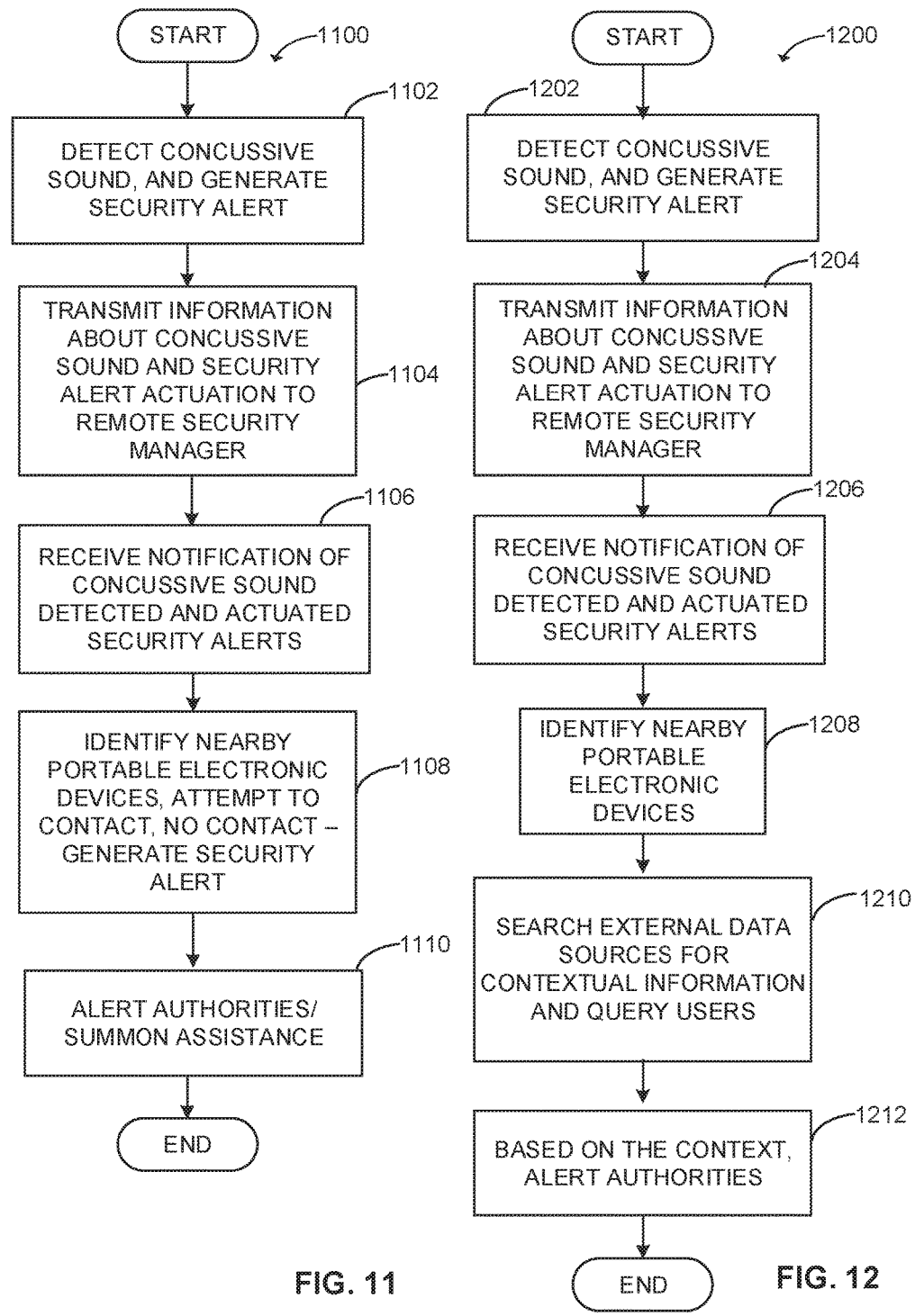

SAFETY SYSTEMS AND METHODS THAT USE PORTABLE ELECTRONIC DEVICES TO MONITOR THE PERSONAL SAFETY OF A USER

FIELD OF THE DISCLOSURE

This disclosure relates generally to portable electronic devices, and, more particularly, to safety systems that use portable electronic devices to monitor the personal safety of a user.

BACKGROUND

In recent years, the sales of portable electronic devices, such as portable cellular telephones, smart watches, fitness trackers, personal digital assistants, etc., have exploded. The increased sales of such devices are due, in large part, to the ever expanding functionality of the devices. While a decade ago most portable electronic devices were able to do little more than communicate phone calls, today's portable electronic devices perform a multitude of tasks aimed at improving the lives and lifestyles of the user.

BRIEF DESCRIPTION OF THE DRAWINGS

FIG. 11 is a flow chart representative of example machine readable instructions which may be executed to implement the example safety monitor of FIG. 1 and FIG. 2, and the example remote safety manager of FIG. 1 and FIG. 3.

FIG. 12 is a flow chart representative of example machine readable instructions which may be executed to implement the example safety monitor of FIG. 1 and FIG. 2, and the example remote safety manager of FIG. 1 and FIG. 3.

Figure 1:
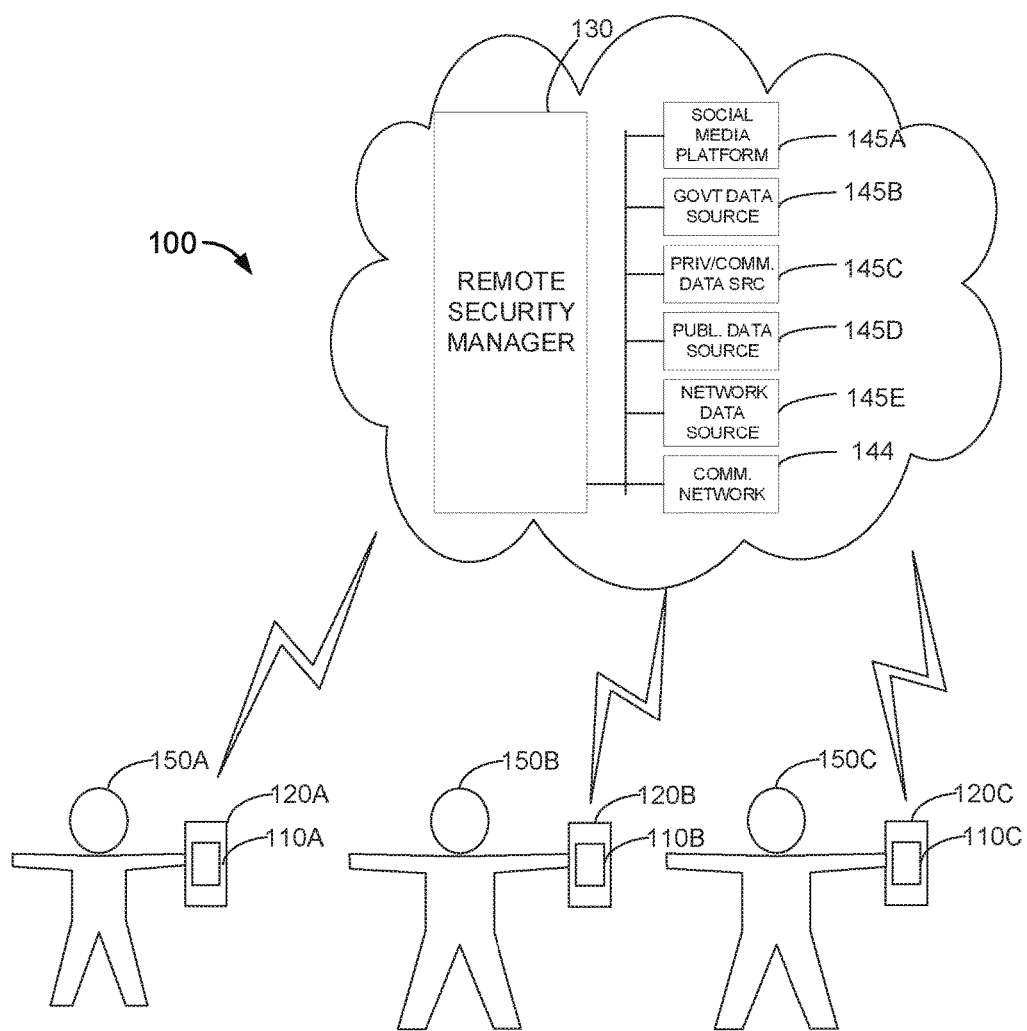
FIG. 1 is a diagram of a safety system having a plurality of safety monitors in example portable electronic devices that communicate with a remote safety manager.

The figures are not to scale. Wherever possible, the same reference numbers will be used throughout the drawing(s) and accompanying written description to refer to the same or like parts. Further, devices that are referenced using a same number followed by different letters (e.g., 110A versus 110B) will have all or at least some of the same components (e.g., the example second safety monitor 110B and third safety monitor 110C described below include the same components as the example first safety monitor 110A described below).

DETAILED DESCRIPTION

Although previously limited to a set of communication-directed technologies (e.g., telephone communication, text communication, Internet access, etc.), portable electronic devices of today are capable of performing an ever-expanding set of tasks directed to improving the lives and lifestyles of the user. For example, modern cell phones and other portable electronic devices can be used to perform a variety of tasks including, count calories and track exercise, map a route to a destination, provide real-time traffic updates, manage a financial budget, access banking institutions, access video and non-video entertainment, etc. As a result of these capabilities, users increasingly carry their portable electronic devices throughout the day.

Many users also carry a portable electronic device when they expect to be in a potentially dangerous situation (in a high crime area, an isolated area, a riotous area, a crowded area susceptible to nefarious activities such as pick pocketing, terrorism, etc.) in the hopes that, if assaulted or faced with trouble, they will be able to use the device to summon assistance from the police department, the fire department, a friend, and/or another entity. Unfortunately, a user being assaulted, threatened or even impaired often lacks the time and/or clarity of mind needed to reach assistance via the portable device. Likewise, users will often rely on portable electronic devices when faced with a medical emergency. However, such users but may be unconscious or otherwise physically unable to use the portable electronic device to summon assistance. As a result, there is a need for safety systems that use portable electronic devices to detect a threat to a user's safety and/or a medical emergency and to respond to the threat and/or emergency in an automated fashion.

An example personal safety monitor disclosed herein is located in a portable electronic device and accesses remote safety managers that can be disposed in the cloud, in communication network devices, in a user's home/work, in one or more other portable electronic devices associated with other users. The personal safety monitor of some such examples determines a threshold alert level that indicates a degree (high, medium, low, etc.) of danger (or risk) to which a user of the portable electronic device is exposed. Based on sensor information collected by one or more sensor(s) disposed on and off the portable electronic device, as well as information received from information resources external to the portable electronic device, the personal safety monitor adjusts the threshold alert level as needed to account for the circumstances surrounding (or otherwise affecting) the user.

In some examples, the sensor(s) are carried by the portable electronic device and include an array of biological sensor(s), a microphone, a still image camera, a video camera, a humidity detector, a heat sensor, a liquid sensor, a global positioning system (GPS) sensor, an array of motion sensing detectors (e.g., an accelerometer, a gyroscope, etc.), etc. In some examples, the sensor(s) that are not carried by the portable electronic device can be carried in other devices (e.g., smart watch, fitness monitor, biological monitors, headphones, earbuds) worn or carried by the user of the portable electronic device. In some such examples, the other devices are in communication with the portable electronic device. In some examples, the other devices are not necessarily associated with the physical person of the user of the portable electronic device but are in the surroundings of the user (e.g., surveillance audio recorders, surveillance video cameras, smoke, sensor(s), fire sensor(s), heat sensor(s), liquid sensor(s), carbon dioxide sensor(s), etc.). In some examples the other devices communicate information to the portable electronic device via Bluetooth, RFID, cellular telephony, Wi-Fi, etc.)

In some examples, sensor information collected by the portable electronic device is analyzed by the safety monitor of the portable electronic device using a machine-learning algorithm. The machine-learning algorithm uses information such as one or more of the sensor information, time and date information, location information, portable device usage information, etc., to determine one or more daily, weekly, and/or monthly routines engaged in by the user. The machine-learning algorithm can also use information about which, if any, of the routines corresponds to a higher threshold alert level or a lower threshold alert level, (e.g., based on a degree of danger and/or risk). In some examples, the portable electronic device can be configured to identify deviations from a daily, weekly, or monthly routine and to raise (or lower) a threshold alert level in response to such deviations.

In some examples, the machine learning algorithm of the safety monitor uses the collected sensor information to pre-emptively predict a possible threat to the user or infer a possible threat. In some such examples, the safety monitor can notify the user of the possible threat so that user can device how to proceed in light of the threat. In some such examples, the machine learning algorithm assigns a threshold alert level to the predicted threat and identifies attributes to be monitored and used to identify when (if) the threat becomes a reality.

In some examples, the safety monitor determines that the user is in need of assistance based on a current threshold alert level and based on the detection of one or more sensor indications associated with abnormal activity. Abnormal activities are activities that are detectable by the portable electronic device sensor(s) and that can be associated with a threat, injury and/or assault on the user. Some such abnormal activities can include the portable electronic device being dropped or thrown to the ground, the portable electronic device having an unusual trajectory, the user having an increased heart rate, the user having an increased respiratory rate, the user (or a by-stander) screaming, or saying a "trigger" word designed to trigger a safety/safety alert, etc. Such abnormal activities can be detected by one or more of the motion sensor(s) on or off the portable electronic device, one or more of the biological sensor(s) on or off the portable electronic device, and/or one or more of the audio detectors on or off the portable electronic device, and/or any of the sensor(s) described above. As further described above, in some examples, the sensor(s) disposed off the portable devices are disposed in one or more other portable devices associated (worn, carried, driven) with the user, including, for example, an electronic watch, an electronic pedometer, an electronic heart monitor, headphones, earbuds, jewelry, a water bottle, a bicycle, a steering wheel of an automobile, etc. In some examples, the sensor(s) disposed off the portable devices are disposed in one or more stationary devices including, for example, a surveillance camera, a surveillance microphone, a fire alarm, a heat sensor, a smoke sensor, a motion sensor, etc. In some examples, the safety monitor analyzes information collected at the sensor(s) to determine if an abnormal activity is detected. In some examples, the safety monitor analyzes audio captured at an audio sensor (e.g., a microphone) to determine whether the audio correlates to a cry for help, a keyword used to signal a need for assistance, a voice characteristic corresponding to the user being in distress, etc. In some examples, the safety monitor analyzes motion information captured by one or more sensor(s) (e.g., a gyroscope, an accelerometers, etc.) to determine whether the motion information corresponds to the portable electronic device being dropped, thrown, tossed, being carried while the user is running, being carried while the user is walking, being carried when the user is or has fallen down, to the user making a body gesture/movement associated with distress, etc. The motion information may also indicate that a body part of the user experienced an unusual acceleration due to, for example, being struck by an object (e.g., motion sensors disposed in headphone worn by user indicate user's head accelerated but sensors disposed elsewhere on the body indicate the body generally did not experience the same acceleration). A sensor disposed in the steering wheel of the user's auto may indicate the user suddenly gripped the steering with force that exceeds or reaches a threshold value, thereby indicating the auto may have struck an object or is otherwise out of control.

In some examples, when the safety monitor makes a determination that one or more abnormal activities has been detected and that the one or more abnormal activities satisfy a threshold alert level, a safety alert is actuated. The actuation of the safety alert can result in the performance of any of a variety of tasks, the transmission of a message to a police dispatch center, a fire dispatch center, a medical dispatch center, a set of emergency contacts, the generation of an audible alarm, and/or any other action seeking to obtain assistance. In some examples, the parties to be notified in the event of a safety alert can vary depending on the context in which the phone is being used at the time of the alert, the type of abnormal activities detected, the biological parameters of the user at the time of the alert, etc. Actuation of the safety alert can also result in the automatic initiation of a recording and/or a live-stream transmission of audio being captured at the portable electronic device to one or more of the parties receiving the safety alert. Actuation of the safety alert can additionally or alternatively result in the automatic (e.g., without human approval and/or action) transmission of a message to be published via a social medium platform, a private safety monitoring company, an Internet informational platform, etc. Any of the information to be transmitted by the portable electronic device can be transmitted via cellular telephone service, Wi-Fi service, radio waves, a texting application, a messaging application, an email application, a web browser, etc.

In some examples, the portable electronic device provides a notification to the user before or after the safety alert is actuated. The notification, when generated before the safety alert is actuated, can give the user an opportunity to cancel the safety alert. In some examples, the notification, when generated after the safety alert is actuated, can inform the user that, if the alert was unnecessary, they will need to notify the police, emergency contacts, etc., that the alert was a false alarm. In some examples, the notification, when generated after the safety alert is actuated, can inform the user that, if the alert was unnecessary, the portable electronic device will notify the recipients of the safety alert of the false alarm, and/or take one or more actions to rescind the alert (e.g., delete an alarm message posted to a social media site, cease generating an audible alarm, etc.).

In some examples, when the portable electronic device provides a notification to the user allowing the user to cancel the safety alert, the user can respond by entering and/or speaking a code word that causes the portable electronic device to ostensibly cancel the safety alert (by, for example, emitting/displaying a message that says, "safety alert canceled") but that does not in fact cancel the safety alert. Such a code word can be used when the user is forced to cancel the safety alert under duress.

In some examples, the type of abnormal activities that will result in the actuation of a safety alert is dependent upon the context in which the device is being used (also referred as a "usage context"). In some examples, when the user is exercising, sensed information indicating the user has accelerated heart rate and/or increased perspiration may not result in actuation of a safety alert. In contrast, the same information detected when the user is walking on a poorly lit street in a high crime area may result in actuation of a safety alert. In some examples, the user of the portable electronic device can actuate a safety alert through the user of an input device.

Example personal safety monitors disclosed herein communicate with an off-device remote safety manager(s). The off-device remote safety manager can be disposed in the cloud (or in the user's home or at the user's place of employment, etc.) and implemented using one or more processors with access to one or more public, private and/or governmental services/databases. In some examples, the remote safety manager includes multiple processors disposed at various locations that collaborate to collect and analyze information supplied by: 1) the one or more services/databases, 2) safety monitors of other portable electronic devices, 3) a plurality of sensor(s) disposed near, on and/or remotely from the portable electronic device.

In some examples, the remote safety manager receives past usage history from the safety monitor as well as real-time usage data. In some such examples, the remote safety managers include machine learning technology to duplicate, supplement, and/or replace the machine-learning algorithms on the portable electronic device. In some examples, the remote safety manager and the safety monitor receive and use information from a plurality of sources including governmental law enforcement and/or fire and rescue agencies, public utility agencies, private security agencies, social media platforms, weather monitoring agencies, other portable electronic devices associated with other users, etc.

Thus, the safety system disclosed herein provides many advantages including, automatic monitoring of a user's safety and well-being, and automatic actuation of a safety alert when the safety of the user is determined to be (or might be) in jeopardy based on detected abnormal activities and/or a usage context. Further, the accuracy of the automatic monitoring and automatic actuation is enhanced through the use of information collected from a variety of sources and the use machine learning technology disposed both on a user portable electronic device and on a remote safety manager.

FIG. 1 is a diagram of an example safety system 100 having example safety monitors (e.g., a first safety monitor 110A, a second safety monitor 110B, a third safety monitor 110C, etc.) in respective example portable electronic devices (e.g., a first portable electronic device 120A, a second portable electronic device 120B, a third portable electronic device 120C) that communicate with an example remote safety manager 130. The remote safety manager 130 can be disposed in the cloud, in a communication network device, and/or disposed at one or more locations associated with a user (e.g., the user's home, the user's automobile, the user's place of employment, etc.). In some such examples, the remote safety manager 130 can include multiple remote safety manager sites that operate in a collective fashion and/or in a replicative fashion. The remote safety manager 130 is in communication (via communication network(s) 144) with a variety of electronically accessible services and information resources 145 (e.g., social medium platforms/services 145A, governmental services/databases 145B, private/commercial services/databases 145C, public services/databases 145D, communication network information centers 145E, etc.).

Users (e.g., a first user 150A, a second user 150B, a third user 150C, etc.) operate the portable electronic devices 120A, 120B, 120C, respectively. In some examples, the portable electronic devices 120A, 120B, 120C are implemented using a smart phone having telephone capabilities, texting capabilities, location tracking capabilities, Wi-Fi communication capabilities, Bluetooth communication capabilities, etc. In some examples, the safety monitors 110A, 110B, 110C are configured to track the locations of the respective users 150A, 150B, 150C, and collect user input and sensor information from one or more sensor(s) disposed on (and/or off) the portable electronic device 120A, 120B, 120C. In some examples, each of the safety monitors 110A, 110B, 110C uses the collected information to generate and store a past usage history corresponding to the usage of the associated portable electronic device 120A, 120B, 120C. The past usage histories are used to identify various contexts in which the corresponding user 150A, 150B, 150C uses the respective portable electronic device 120A, 120B, 120C. In some examples, the safety monitors 110A, 110B, 110C are configured to use information supplied by one or more of the electronically accessible services and information resources 145A, 145B, 145C, 145D to identify the various contexts. In some examples, the safety monitors 110A, 110B, 110C are configured to use information supplied by each other and by any other portable electronic devices associated with other users to identify the various contexts.

In some examples, the safety monitors (e.g., the first safety monitor 110A, the second safety monitor 110B, the third safety monitor 110C, etc.) use a corresponding past usage history to identify a set of daily, weekly, and/or monthly routines of the first user 150A, the second user 150B, the third user 150C, respectively. The respective safety monitors (e.g., the first safety monitor 110A, the second safety monitor 110B, the third safety monitor 110C, etc.) use any of the corresponding past usage history, the routine information, the sensed information, user input(s), time of day information, location information, information obtained from the remote safety manager 130, etc., to determine a respective threshold alert level for the first user 150A, the second user 150B, and the third user 150C, respectively. Each threshold alert level generally corresponds to an amount or likelihood of danger or potential danger to which the respective one of the first user 150A, the second user 150B, and the third user 150C is currently exposed. In some examples, a high threshold alert level corresponds to a low level of danger because when the corresponding one of the users is exposed to a low level of danger the safety monitor has a higher threshold for abnormal activities before a safety alert will be actuated. Similarly, a low threshold alert level corresponds to a high level of danger because when the user is exposed to a high level of danger, the safety monitor has a lower threshold for abnormal activities before a safety alert will be actuated. The first, second and third safety monitors 110A, 110B, and 110C are also configured to adjust (e.g., raise or lower) the threshold alert level based on changing sensor information, changing routines, a change in the time of day, a change in location, information obtained in real-time from the remote safety manager 130, etc. Any number of threshold alert levels may be used to represent a spectrum of danger levels (e.g., a low threshold alert level, a medium threshold alert level, a high threshold alert level, a first threshold alert level, a second threshold alert level, etc.)

In addition to determining and, as needed, adjusting the threshold alert level, the first, second, and third safety monitors 110A, 110B, and 110C are each configured to automatically actuate a safety alert and/or respond to user input that actuates a safety alert. In some examples, a safety alert, when actuated (or shortly thereafter to give the user an opportunity to counteract), results in the transmission of a message or messages summoning assistance from any or all of a governmental agency enforcement agency, a private security agency, any of a set of user emergency contacts stored in the smart phone 120, a message transmitted to electronic devices determined to be located near (e.g., within a threshold distance of, within a same building as, at a same venue as, etc.) the user, etc. In some examples, a safety alert, when actuated, instead (or also) results in the generation of an audible alarm. A safety alert can also (or instead) result in the capture and live streaming of video and/or audio to a source of assistance. In some examples, a safety alert can also (or instead) result in the capture of a device ID from an assailant's smartphone for usage by police. In some examples, the type(s) of actions to be taken when a safety alert is generated depend on the types and values of attributes that caused the safety alert to be actuated, a location of the user, the surroundings of the user, and/or any other factor. In some examples, the first, second, and third safety monitors 110A, 110B, 110C are configured to actuate safety alerts based on any or all of the sensed information, the past usage history, routines of the user, time, date and location information, user inputs, etc.

Figure 2:
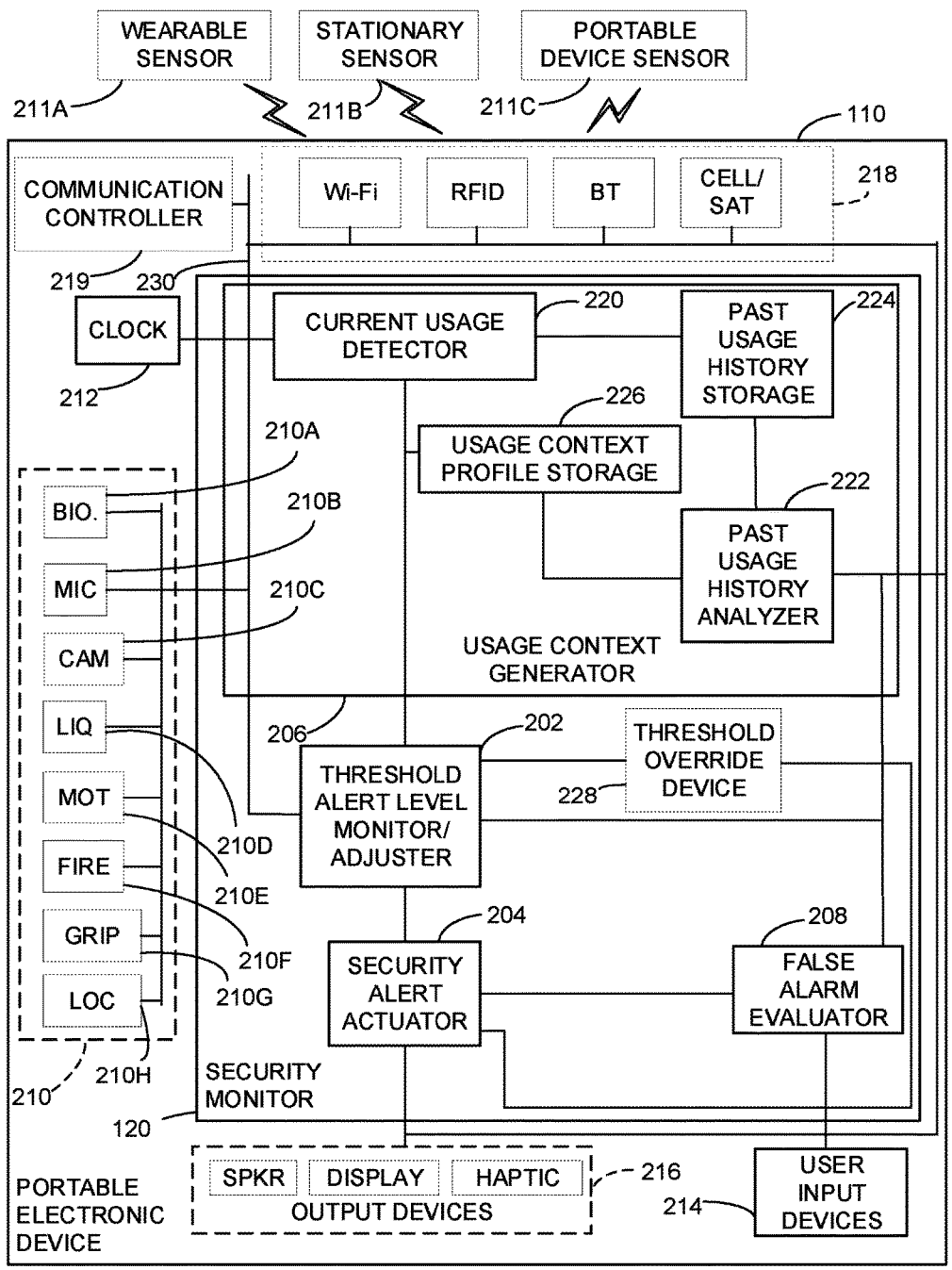
FIG. 2 is a block diagram of an example implementation of the example safety monitor of the example portable electronic device of FIG. 1.

FIG. 2 is a block diagram of an example implementation of the first safety monitor 110A of FIG. 1. In this example, the safety monitor 110A is implemented on the example first portable electronic device 120A of FIG. 1. The example first safety monitor 110A of FIG. 2 includes an example threshold alert level monitor 202, an example safety alert actuator 204, and an example usage context generator 206. In some examples, all or some of the aspects of the safety monitor 110A can be implemented as a System on a Chip (SoC).

In some examples, the threshold alert level monitor 202 monitors a set of usage attributes of the first portable electronic device 120A. In some examples, the usage attributes include sensor information, time/date information, and/or information about usage of the portable electronic device 120A (e.g., whether, when, how frequently, and/or how long the portable electronic device 120A is used to make a call, text, surf the Internet, take photos, record audio, record video, access social media, watch video, listen to audio, execute software applications, play video games, user viewing habits, user reading habits, user listening habits, etc.). The usage attributes can be generated by one or more of a set of on-device sensor(s) 210 (e.g., biological sensor(s) 210A, audio sensor(s) (a microphone 210B), video/still-image sensor(s) (camera 210C), liquid sensor(s) 210D, motion sensor(s) 210E, fire sensor(s) 210F, grip sensor(s) 210G (to detect grip or touch of user), location sensor(s) 210H, etc.) and/or off-device sensor(s) (e.g., wearable sensor(s) 211A, stationary sensor(s) 211B, sensor(s) disposed on other portable electronic devices 211C, etc.), a clock device 212, any of a set of user input devices 214, any of a set of output devices 216 (e.g., speaker, display, haptic devices, etc.), etc. In some examples, some of the usage attributes are associated with an "abnormal" user activity and some are associated with "normal" user activities. In some examples, whether a usage attribute is associated with an abnormal user activity or a normal user activity is situation-dependent (e.g., context-dependent). For example, usage attributes that indicate that the user is running, sweating, and/or has an accelerated heart rate that are detected during a time of day when the user typically exercises and/or when the user is located in a gym are not associated with an abnormal activity. In contrast, the same usage attributes that are detected at a time immediately after a user was determined to be asleep in bed or while the user is walking or driving on a poorly lit street at night in a high crime area are associated with an abnormal activity. In some examples, the same usage attributes, detected when the user is in the parking lot at the user's place of employment in the evening hours, may be associated with an abnormal activity. As a further example, on the fourth of July, the detection of a concussive sound typically associated with detonation of an explosive device will not generate a safety alert, yet the same sound detected on other days of the year may result in a safety alert. Similarly, the detection of a concussive sound while the user is at an amusement park known to have pyrotechnic shows may not result in a safety alert, whereas the same sound detected while the user is in an airport would generate a safety alert.

When a threshold number of usage attributes that are associated with an abnormal activity have been detected and/or have met a threshold value, the threshold alert level monitor 202 determines that a threshold alert level has been satisfied. In some examples, the threshold alert level monitor adjuster 202 may be at a low threshold alert level thereby indicating that the user is possibly in jeopardy. When one or more monitored usage attributes indicate that the user is no longer in jeopardy, the threshold alert level monitor 202 may raise the threshold alert level from a low threshold to a medium threshold alert level or a high threshold alert level. In some examples, the threshold alert level monitor 202 may be at a high threshold alert level thereby indicating that the user probably not in jeopardy. When one or more monitored usage attributes indicate that the user's safety status has changed and the user may be in jeopardy, the threshold alert level monitor 202 may lower the threshold alert level from a high threshold to a medium threshold alert level or a low threshold alert level. Although low, medium and high threshold alert levels are described herein, the safety monitor 110A may use any number of thresholds in connection with the usage context profiles.

In some examples, when the threshold alert level has been satisfied, the threshold alert level monitor 202 sends a signal to the safety alert actuator 204. The safety alert actuator 204 responds to the signal by actuating one or more of the set of output device(s) 216 of the portable electronic device 120A and/or wireless communication devices 218 (e.g., a Wi-Fi transceiver, an RFID transceiver, a Bluetooth transceiver, a cellular and/or satellite transceiver, etc.). In some examples, one or more of the output device(s) of the portable electronic device 120A are not installed in the portable electronic device but are instead installed in devices associated with (or otherwise in communication with) the portable electronic device 120A. Some such devices can include a smart watch, an electronic device embedded on a piece of jewelry (or clothing) worn by the user, an electronic game, and/or any other type of electronic device. The safety alert actuator 204 can be configured to actuate any of the output devices 216 in any desired fashion to notify others of the user's need for assistance. In some examples, the output device(s) 216 to be actuated and the manner in which they are actuated can differ with the type(s) of abnormal activity detected, the time of day, the location of the user, etc. In some examples, a threshold alert level is associated with a user input (e.g., the microphone, the camera, a keypad, a touch screen) such that the threshold alert level is satisfied (and a safety alert is actuated) when a designated type of user input (e.g., a user's scream, a user speaking a safety alert actuation code word, a user making a motion in view of the camera, a user selecting an input at a keypad or a touch screen, a user actuating a pressure sensor, etc.) is detected.

The example usage context history generator 206 of FIG. 2 includes an example current usage detector 220, an example threshold alert level adjuster 221, an example past usage history analyzer 222, an example past usage history storage 224, an example usage context profile storage 226, an example threshold override device 228 and an example first interface bus 230. In some examples, the example current usage detector 220 receives usage attributes from any of 1) the example sensor(s) (e.g., the biological sensor(s) 210A, the microphone 210B, the example camera 210C, the example liquid sensor(s) 210D, the example motion sensor(s) 210E, the example fire sensor(s) 210F, the example grip sensor(s) 210G, the example location sensor(s) 210H, 2) the example remote safety manager 130 (see FIG. 1), 4) the example output devices 216, 5) the example input devices 214, the example communication devices 218, etc., and causes the usage attributes to be stored in the past usage history storage 224. In this manner, the current information collected at the current usage context detector 206 becomes past usage history. In some examples, the current usage detector 220 may generate a user query to be output by one of the output devices 216. The user query can ask for information regarding an environment, habits of the user, routines of the user, preferences of the user, etc. The result of the query can be treated as, for example usage information.

The example past usage history analyzer 222 (also referred to as a usage context analyzer), which can be implemented using any of a neural network, machine learning algorithm(s), artificial intelligence, or programmed logic, etc., is configured to analyze the past usage history stored in the past usage history storage 224 and determine various contexts in which the portable electronic device is used by the user 150A. Based on the analysis, the past usage history analyzer 222 generates usage context profiles and corresponding threshold alert levels. Each usage context profile corresponds to a context in which the portable electronic device 120A is used and includes a set of usage attributes that characterize the usage. In some examples, the past usage history analyzer 222 generates the usage context profiles based on a combination of the past usage history, information received from the electronically accessible services and information resources 145 (e.g., social medium platforms/services 145A, governmental services/databases 145B, private/commercial services/databases 145C, public services/databases 145D, communication network information centers 145E, etc.), information received from the remote safety manager 130, and information received from other portable electronic devices (e.g., the second portable electronic device 120B, the third electronic device 120C, etc.). In some examples, the past usage history analyzer 222 continues to fine-tune/revise the usage context profiles as additional data is received from the electronically accessible services and information resources 145, the remote safety manager 130, the example sensors 210, other electronic devices (e.g., the second portable electronic device 120B, the third portable electronic device 120C, etc.) etc.

In some examples, the past usage history analyzer 222 analyzes the past usage history to identify one or more daily, weekly, and/or monthly routines of the user and assigns usage context profiles based on the routines. In some examples, the past usage history analyzer 222 determines the user has a weekday morning routine associated with a first location (e.g., the user's place of employment), and a first time range (e.g., 9 AM-12 PM) in which usage of the portable electronic device 120A is fairly light. The past usage history analyzer 222 may further determine that threats to the user's safety during this weekday morning routine are low. In some such examples, the past usage history analyzer 222 stores the usage attributes associated with the weekday morning routine (e.g., the location, time range, the level of usage) as a first usage context profile in the usage context profile storage 226 and further assigns a high threshold alert level to the first usage context profile. The high threshold alert level indicates that the level of risk while operating in the first context profile is low and, thus, the safety monitor 110A has a high threshold for abnormal activity (e.g., will tolerate a greater amount of abnormal activity before actuating a safety alert). In some examples, the past usage history analyzer 222 also determines a set of usage attributes that are associated with abnormal activity (if detected when the portable electronic device 120A is operating in the usage context of the usage context profile). The past usage history analyzer 222 further causes such abnormal activity usage attributes to be stored with the usage context profile in the usage context history storage 226. In some examples, the past usage history analyzer 222 also identifies individual values (or thresholds) of the abnormal activity usage attributes that are to be met/satisfied in association with the usage context profile before a corresponding safety alert is actuated.

The example past usage history analyzer 222 continues to analyze the past usage history as new usage data is added by the current usage detector 220. Thus, the past usage history analyzer 222 continues to fine-tune the usage context profiles and corresponding threshold alert levels as new information is received/collected. Further, as described above, the past usage history analyzer 222 continues to fine-tune the usage context profiles and corresponding threshold alert levels as information is received from the electronically accessible services and information resources 145, the remote safety manager 130, the example sensors 210, other electronic devices (e.g., the second portable electronic device 120B, the third portable electronic device 120C, etc.) etc.

In some examples, the example current usage detector 220 determines a context in which the example portable electronic device 120A is currently being used by comparing the current usage attributes to usage attributes associated with the usage context profile(s) stored in the usage context profile storage 214. In some examples, the current usage attributes indicate that the portable electronic device 120A is located at the user's place of employment during a morning weekday and further indicate that usage of the portable electronic device 120A is fairly light. In some such examples, the current usage detector 220 identifies a match between the current usage attributes (e.g., place, date/time, usage activity) and the first usage context profile attributes. As a result, the current usage detector 220 determines that the threshold alert level corresponding to the first usage context profile (e.g., a high threshold alert level) is to be supplied to the threshold alert level monitor 202. In addition, the current usage detector 220 causes the abnormal activity usage attributes (and any corresponding output values/thresholds) stored with the first usage context profile to be supplied to the threshold alert level monitor 202.

In some examples, in response to receiving the high threshold alert level, and the abnormal activity usage attributes, the threshold alert level monitor 202 begins monitoring the sensor information supplied by the sensor(s) 210 that collect the abnormal activity usage attributes. As described above, a high threshold alert level is used when the user is in a safe environment and unlikely to be threatened by danger (e.g., assault) or a health threat. Thus, the safety monitor 110A has a high threshold for sensor indications associated with abnormal activity (e.g., sensor indications that may indicate that an assault is taking place). In some examples, abnormal activities that may indicate a threat (such as an assault) is occurring include the portable electronic device 120A being dropped or thrown to the ground, the user 150A experiencing an accelerated heart rate, the user having an increased respiratory rate, the user screaming (or saying a code word used to signal distress or using a vocal tone that corresponds to the user being in distress), the user experiencing increased perspiration, etc. Some such abnormal activities can be detected by one or more of the sensor(s) including the biological sensor(s) 210A, the microphone 210B, the camera 210C, the motion sensor(s), 210E, etc. In some examples, detection of any one of the abnormal activities will cause a safety alert to be actuated. In some examples, detection of a threshold number of the abnormal activities will cause a safety alert to be actuated. In some examples, a safety alert will be actuated when one or more (or any combination) of the usage attributes associated with the abnormal activity reaches a threshold value (e.g., the user's pulse reaches or exceeds a threshold pulse rate, the user's voice volume reaches or exceeds a threshold decibel level, etc.). In some examples, the threshold value is a rate of change of a usage attribute (e.g., a rate at which a user's pulse increases or decreases over time, a rate at which a user's perspiration changes, a rate at which a user's voice level changes, etc.).

In some examples, when the threshold alert level has been met/satisfied (e.g., a required number of the abnormal activities and/or associated usage attributes have been detected), the example threshold alert level monitor 202 sends a signal to the safety alert actuator 204 which responds to the signal by actuating any or all of the output devices 216 and/or any or all of the communication devices 218. In some examples the safety alert actuator 204 causes one or more of the output devices to transmit a message summoning assistance, to record and/or live stream audio and/or video, to emit a loud sound, to transmit a notification to other portable electronic devices (e.g., the second and/or third portable electronic device 120B, 120C) located within a geographical distance of the first portable electronic device 120A, etc. The safety alert actuator 204 can be configured to actuate any of the output devices in any desired fashion to notify others of the user's need for assistance. In some examples, the past history usage analyzer 222 may be notified of the safety alert generated by the safety alert actuator 204. In some such examples, the history usage analyzer 222 can respond by analyzing the current usage attributes of the current usage detector 220 and/or any other information from any other source, and make a determination in real-time as to which of the output devices 216 and/or communication devices 218 are to be actuated in response to the safety alert.

In some examples, the types of output devices 216 to be actuated by the safety alert actuator 204 vary depending on the current usage context (e.g., the location of the portable electronic device 120, the time of day, the day of the week, etc.) In some examples, the types of the output devices 216 to be actuated by the safety alert actuator 204 depends on the threshold alert level existing at the time of the safety alert, the severity of the sensor outputs that caused the safety alert, etc. In some examples, the order in which the device outputs 216 and/or communication devices 218 are actuated and a manner in which the device outputs 216 and/or communication devices 218 are actuated can differ based on the threshold alert level existing at the time of the safety alert and/or outputs of the sensor(s) 210. In some examples, the safety alert actuator 204 causes one of the output devices 216 to supply a first message to one of the communication devices 218. In some such examples, the safety alert actuator 204 causes the communication device 218 to transmit the message to a governmental law enforcement agency, to a governmental paramedic/fire department, to a list of emergency contacts, etc. In some examples, the message is communicated via phone call, a text message, an email, a social media platform, a streaming video file, a streaming audio file, a voicemail, etc., In some such examples, the first message can identify a current location of the user, the identity of the user and information regarding the type of threat to which the user is exposed (e.g., "John Doe is located at the intersection of State and Main, may have been assaulted, and requires immediate assistance."). The first message can also transmit any additional information about the user 150A and the portable electronic device 120A.

In some examples, the safety alert actuator 204 may additionally cause a second message (or other indication) to be provided to the user 150A via one of the output devices 216. The second message can inform the user 150A of the transmission of the first message and can also provide the user 150A with the option to send a safety alert cancellation message to the recipients of the first message. In some examples, the user can select the safety alert cancellation via one of the input devices 214, thereby indicating that a false alarm has been generated. In response to the selection of the cancellation, the false alarm evaluator 208 notifies the safety alert actuator 204. The safety alert actuator 204 responds by causing one or more of the output devices 216 and/or communication devices 218 to transmit a cancellation message to the recipients of the first message, to cause a speaker to stop generating an audible alarm, to cause the alert to be rescinded, etc.

In some examples, the second message can simply instruct the user 150A to manually contact the recipients of the first message if the safety alert was a false alarm. In other examples, before sending the first message, the safety alert actuator 204 can cause one or more of the output devices 216 to generate a user alert indicating that a safety alert has been detected and further asking the user to confirm the need to obtain assistance by activating an input device of the portable electronic device 120. When the user confirms the need to obtain assistance, the safety alert actuator 204 can cause one or more output devices 216 and/or the communication devices 218 to contact one or more of the entities identified above for assistance (e.g., to send the first message).

In some examples, the safety alert actuator 204 can cause one or more the output devices 216 to inform the user 150A that the safety alert has been detected and further informing the user 150A that, unless the user 150A instructs otherwise (e.g., within a time window such as 5 seconds, 10 seconds, etc.), a safety alert message will be transmitted to one or more of the entities identified above, an audible alarm will be generated, audio/voice data will be live streamed to other devices, etc. In the absence of a user input indicating that the first message should not be sent to one or more of the third parties who may provide assistance, the safety alert actuator 204 can cause one or more output devices 216 and/or the communication devices 218 to contact one or more entities with a request for assistance as described above.

In some examples, the input indicating whether a safety alert is legitimate (or a false alarm) is received at the false alarm evaluator 208. The false alarm evaluator 208 notifies the safety alert actuator 204 as to whether the safety alert is legitimate and the safety alert actuator 204 responds, in the manner described above. In addition, the false alarm evaluator 208 supplies information identifying the legitimacy (or lack thereof) of the safety alert to the past usage history and data analyzer 222 for use in improving, fine-tuning and/or updating one or more of the usage context profiles. In some examples, the past usage analyzer 222 may respond to the information supplied by the false alarm evaluator 208 by modifying (e.g., changing from low to high) the threshold alert level corresponding to the usage context profile in the usage context profile storage. In some such examples, the past usage history analyzer 222 may modify (e.g., increase or decrease) the number of abnormal activity usage attributes to be met/satisfied before a safety alert is to be generated. In some examples, the past usage history analyzer 222 may change one or more of the types of usage attributes to be met/satisfied before a safety alert is to be actuated. In some examples, the past usage history analyzer 222 may modify threshold values associated with usage attributes to be reached or exceeded before the safety alert is to be actuated.

In some examples, the example past usage history analyzer 222 is configured to analyze information indicating whether a false alarm has been detected by the example safety alert actuator 204 in addition to the past usage history information. In some such examples, the past usage history analyzer 222 may determine that a usage context previously assigned a low threshold alert level has resulted in the generation of one or more false alarms, and, in response, may change the threshold alert level to a high. In contrast, the past usage history analyzer 222 may determine that a usage context previously assigned a high threshold alert level has consistently resulted in the generation of legitimate safety alerts, and, in response, may change the threshold alert level to a low threshold alert level.

Thus, the example first safety monitor 110A of FIG. 1 and FIG. 2 (and likewise the example second and third safety monitors 110B, 110C) determines a level of threat to which the user 150A of the portable electronic device 120A is exposed. Based on the level of threat, a detection of a combination of abnormal activity usage attributes, and a usage context, the safety monitor 110A generates a safety alert to automatically (e.g., without human assistance or approval) notify authorities, friends, and/or others of the user's need for immediate assistance, to stream audio and/or video to authorities, friends, and/or others, to cause one or more of the output devices 216 (e.g., the speaker or a light device) to generate an alarm (e.g., emit a siren-like noise, flash a light), to transmit commands to devices in the vicinity of the user 150A (e.g., to transmit a command to actuate a stationary siren in the vicinity of the user, to transmit a command to actuate a street lamp in the vicinity of the user, to transmit a command (or message) to other portable electronic devices 150B, 150C in the vicinity of the user 150A), etc. In some examples, a command transmitted from the first portable electronic device 120A to the second and/or third portable electronic device 120B, 120C may cause the second and/or third portable electronic device 120B, 120C to contact authorities on behalf of the user 150A.

As described above, the example first safety monitor 110A determines a set of usage contexts and corresponding usage context profiles based on current usage data collected by the first portable electronic device 120A, and also based on past usage data collected by the first portable electronic device 120A. In addition, the first safety monitor 110A uses artificial intelligence, machine learning and/or a neural network to continuously fine-tune the usage contexts, the usage context profiles, the usage context profile attributes, the abnormal usage attributes, the criteria to be met by the abnormal usage attributes before a safety alert is warranted, etc., as additional usage data is collected. In some examples, the first safety monitor 110A revises/fine-tunes the usage contexts, the usage context profiles, the usage context profile attributes, the abnormal usage attributes, the criteria to be met by the abnormal usage attributes before a safety alert is warranted, etc., based on information received from the electronically accessible services and information resources 145 (e.g., the social medium platforms/services 145A, the governmental services/databases 145B, the private/commercial services/databases 145C, the public services/databases 145D, the communication network information centers 145E, etc.). In some examples, the first safety monitor 110A can additionally revise and/or fine-tune the usage contexts, the usage context profiles, the usage context profile attributes, the abnormal usage attributes, the criteria to be met by the abnormal usage attributes before a safety alert is warranted, etc., based on information received from the remote safety manager 130 (see FIG. 1 and FIG. 3). In some examples, as described further below, the remote safety manager 130 revises and fine-tunes the usage contexts, the usage context profiles, the usage context profile attributes, the abnormal usage attributes, the criteria to be met by the abnormal usage attributes before a safety alert is warranted, etc., and supplies the revised/fine-tuned information to the first safety monitor 110A for use in operating. In some such examples, the revised/fine-tuned information can be supplied by the remote safety manager 130 to the example past usage history and data analyzer 222 of the safety monitor 110A. In some such examples, the remote safety manager 130 may revise a usage context profile and a corresponding threshold alert level currently in use at the safety monitor 110A. In some such examples, the remote safety manager 130 may cause the past usage history and data analyzer 222 to supply the revised threshold alert level and any other relevant information directly to the example threshold alert level adjuster 221 for delivery to the threshold alert level monitor 202 for immediate use in monitoring the safety of the user 150A. In some examples, changes to the threshold alert level includes changes to the abnormal activity usage attributes to be monitored, changes to the levels associated with the abnormal activity usage attributes, changes to the number of abnormal activity usage attributes that will result in a safety alert actuation, etc. In some examples, the usage contexts, the usage context profiles, the usage context profile attributes, the abnormal usage attributes, the criteria to be met by the abnormal usage attributes before a safety alert is warranted, etc., are revised and/or fine-tuned by either or both of the first safety monitor 110A and the remote safety manager 130. In some examples, the revising/fine-tuning of the usage context profiles (by either of the remote safety manager 130 and/or the first safety monitor 110A) occurs in real-time as additional usage data and/or data is received from electronically accessible services and information resources 145 (e.g., the social medium platforms/services 145A, the governmental services/databases 145B, the private/commercial services/databases 145C, the public services/databases 145D, the communication network information centers 145E, etc.), other portable electronic devices, etc.

In some examples, the example safety monitor 110A includes an example threshold override device 228. In some such examples, the user 150A can use one of the example input devices 214 of the example portable electronic device 120A to manually activate the threshold override device 228. In some such examples, the user 150A activates the threshold override device 228 in response to feeling threatened in an environment or feeling unwell. In response to actuation of the threshold override device 228, the safety alert actuator 204 disregards the current threshold alert level and the associated abnormal activity usage attributes and instead uses, for example, a first default threshold alert level that corresponds to one or more default abnormal activity usage attributes. When the first default abnormal activity usage attribute is detected, the threshold alert level monitor 202 signals the safety alert actuator 204 which in turn actuates the appropriate output devices 216 and/or communication devices 218 to summon assistance on behalf of the user 150A.

In some examples, when the user 150A has personal safety concerns (e.g., when walking alone on a poorly lit street in a high crime area), the user 150A actuates the threshold override device 228 by pressing an input button, touching a touch screen, speaking a phrase into the microphone, etc. In some examples, in addition to actuating the threshold alert override device 228, the user 150A indicates whether the threshold alert level is to be downgraded or upgraded. In some examples, if the threshold alert level is to be upgraded, the threshold override device 228 causes the threshold alert level monitor 202 to change the current threshold alert level (e.g., high or low) to a critical threshold alert level (also referred to as a first default threshold alert level). When in the critical threshold alert level, the threshold alert level monitor 202 causes the safety alert to be actuated when one or more critical abnormal activity usage attributes are detected. In some examples, the critical abnormal activity usage attribute corresponds to the portable electronic device 120A being dropped or thrown, tossed, etc., by the user 120. In some examples, the critical abnormal activity usage attribute indicating that the portable electronic device 120A has hit the ground may indicate that the falling of the device corresponds to the user falling down, (e.g., when the portable electronic device 120A was stored in an article of clothing worn by the user at the time that the usage attribute was detected). In some such examples, information supplied by the motion detectors (e.g., the accelerometers, the gyroscopes, etc.) is monitored by the threshold alert level monitor 202. When the information supplied by the motion detectors indicates the portable electronic device 120A has been dropped or thrown, the threshold alert level monitor 202 causes the safety alert actuator 204 to actuate one or more of the output devices to automatically summon assistance on behalf of the user 150A. In some such examples, the user 150A need not make any phone call, press any buttons, and/or speak any particular phrase; all actions that can be difficult to do when under attack. Instead, the user need only drop the portable electronic device. Likewise, if the user is attacked and the portable electronic device 110A falls to the ground, the safety alert will automatically be actuated.

In some examples, the critical abnormal activity usage attribute corresponds to the portable electronic device 120A being tightly gripped by the user 150A. In some such examples, information supplied by a pressure sensor is monitored by the threshold alert level monitor 202. When the information supplied by the pressure sensor indicates the portable electronic device 120A has been gripped tightly (e.g., the user's grip tightens), the threshold alert level monitor 202 causes the safety alert actuator 204 to actuate one or more of the output devices to automatically summon assistance on behalf of the user 150A. In some such examples, the user 150A need not make any phone call, press any buttons, and/or speak any particular phrase; all actions that can be difficult to do when under attack. Instead, the user 150A need only squeeze the portable electronic device 120A tightly enough (with more than a threshold amount of force) to actuate a pressure sensor. In some such examples, the pressure sensor may be embedded in the portable electronic device. In some such examples, the pressure sensor may be embedded in a case in which the portable electronic device is held or in a sheet of material wrapped around a water bottle or other similar object carried by the user. In some such examples, the pressure sensor includes Bluetooth communication capabilities and transmits a Bluetooth signal indicating the pressure sensor has been actuated to the Bluetooth transceiver of the portable electronic device 120. In some such examples, the threshold alert level monitor 202 monitors the Bluetooth transceiver for an input signal indicating that the pressure sensor has been actuated and responds to such a signal by causing the safety alert actuator 204 to actuate the set of output devices.

In some examples, the user 150A can manually activate the threshold override device 228 when the threshold alert level indicates the user may be in danger (e.g., the threshold alert level is low) yet the user 150A is in a safe environment. In some such examples, the user 150A indicates that the threshold alert level is to be downgraded. In some examples, if the threshold alert level is to be downgraded, the threshold override device 228 causes the threshold alert level monitor 202 to change the current threshold alert level (e.g., high or low) to the second default threshold alert level. In some such examples, the safety alert actuator 204 disregards the current threshold alert level and the associated abnormal activity usage attributes and instead uses the second default threshold alert level that corresponds to one or more second default abnormal activity usage attributes.

The example sensor(s) can be carried by the example portable electronic device 120A or can be carried by other items/devices associated with the user 150A (e.g., earrings, clothing, watches, jewelry, an automobile, a case holding the portable electronic device, etc.) and/or at locations that the user frequents (e.g., the user's home, the user's place of employment, the user's health club, the user's school, etc.). In some examples, the sensor(s) 211 carried by items/devices other than the portable electronic device 120A include a communication mechanism to transmit sensed information to the portable electronic device 120. In some such examples, the communication mechanism can be implemented using any types of wireless communication technology (e.g., Bluetooth, RFID, cellular telephony, satellite telephony, etc.). In some examples, the sensor(s) are coupled to and communicate via an Internet of Things. In some examples, the off-device sensor(s) 211 include biological sensor(s) (e.g., pulse sensor, body temperature sensor, etc.), environmental sensor(s) (e.g., temperature sensor, smoke sensor, liquid sensor, audio sensor, video sensor, light sensor, etc.), motion sensor(s) (e.g., gyroscopes, accelerometers, etc.), location sensor(s), etc. The sensor(s) 210 may be native to the portable electronic device 110A or may be added (e.g., an after-market product) to the portable electronic device 110A. Likewise, the sensor(s) 211 may be native to the other portable devices by which the sensor(s) 211 are carried or may be added (e.g., an after-market product).

The example on-device sensor(s) 210A-210H, and the off-device sensors 218 can include apparatus that both detects information and that converts the information to a form suitable for usage by the safety monitor 110A. For example, the motion sensor(s) 210 may detect a movement and may supply information identifying the magnitude, direction, speed, etc., of the movement to the safety monitor 110A. Likewise, the location sensor(s) 210H may detect satellite signals and use the satellite signals to determine a location. The location sensor(s) 210H transmits the location information to the safety monitor 110A. Similarly, the audio sensor(s)/microphone 210B may detect sound and perform language processing on the sound to detect spoken words. The audio sensor(s)/microphone 210B transmit the words to the safety monitor 110A. Likewise, any of the sensors 210A-210H may process raw data to generate information to be transmitted to the safety monitor 110A. In some examples, the raw data is supplied by the sensor(s) 210A-210H to the safety monitor 110A and the safety monitor 110A can convert the raw data to a suitable format.

In some examples, any of the information communicated from/to any of the example threshold alert level monitor 202, the example safety alert actuator 204, the example false alarm evaluator 208, the example threshold override device 228, the example input sensor(s) 210A-210H, the example input devices 214, the example output devices 216, and/or the example communication transceivers 218 is controlled by the example communication controller 219 coupled to the example first interface bus 230.

Figure 3:
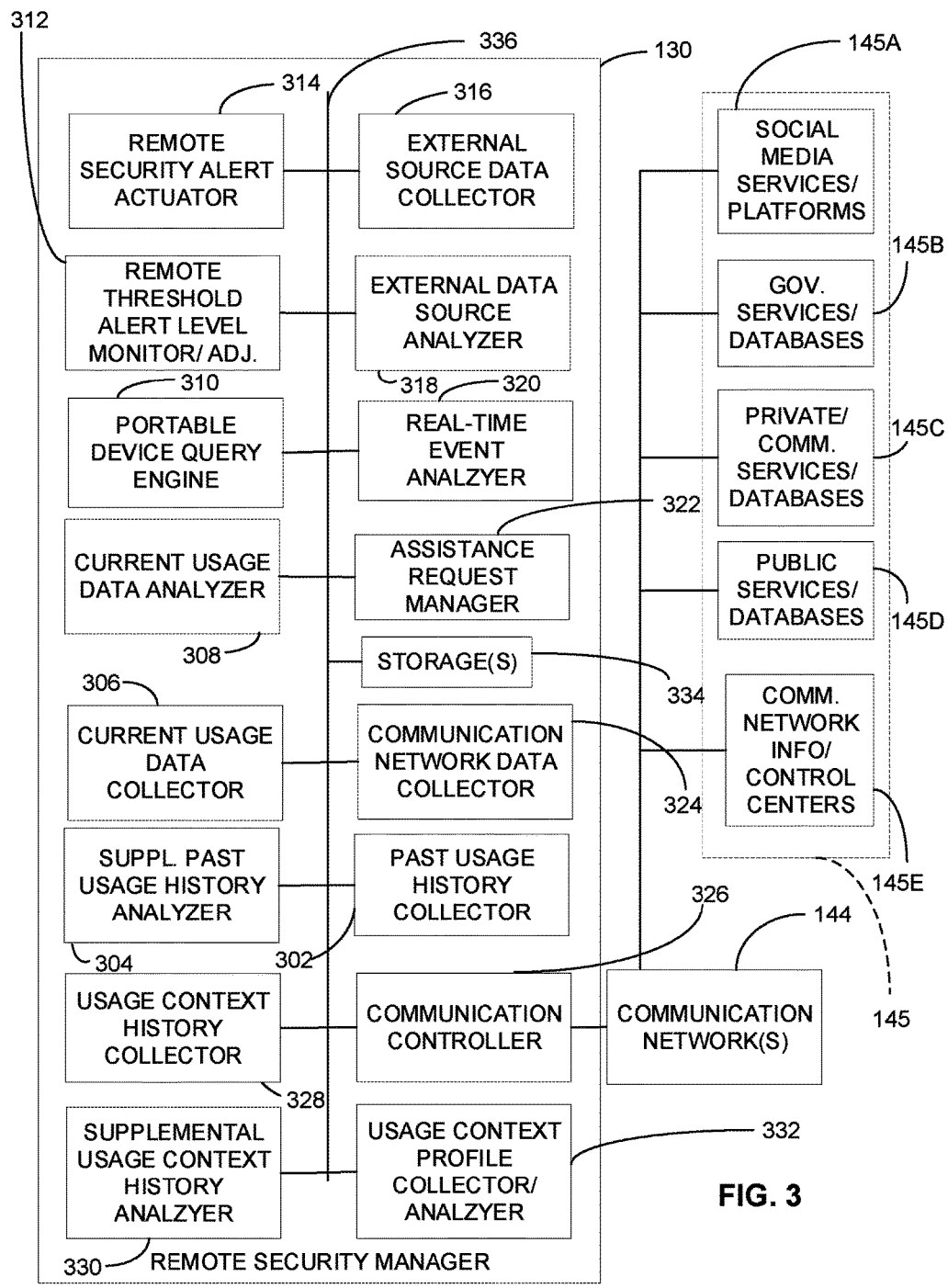
FIG. 3 is a block diagram of an example implementation of the example remote safety manager of the example safety system of FIG. 1.

FIG. 3 is a block diagram of an example implementation of the example remote safety manager 130. In some examples, the remote safety manager 130 includes an example past usage history collector 302, an example supplemental past usage history analyzer 304, an example current usage data collector 306, an example current usage data analyzer 308, an example portable device query engine 310, an example remote threshold alert level adjuster 311, an example remote threshold alert level monitor 312, an example remote safety alert actuator 314, an example external source data collector 316, an example external source data analyzer 318, an example real-time event analyzer 320, an example assistance request manager 322, an example communication network data collector 324, and an example communication controller 326, an example usage context history collector 328, an example supplemental usage context history analyzer 330, an example usage context profile collector/analyzer 332, example storage(s) 334, and an example second interface bus 336. In some examples, the example communication controller 326 controls communications occurring on the second interface bus 336.

In some examples, the remote safety manager 130 enhances and supplements the safety monitoring functionality of the example first, second, and third safety monitors 120A, 120B, 120C (see FIG. 2). In some such examples, the remote safety manager 130 receives, via a communication network(s) 144, information from the safety monitors (e.g., the first, second and third safety monitors 120A, 120B, 120C), and also collects (via the communication network(s) 144) information from a variety of external electronically accessible source 145 (e.g., the example social medium platforms/services 145A, the example governmental services/databases 145B, the example private/commercial services/databases 145C, the example public services/databases 145D, the example communication network information centers 145E, etc.). In some examples, the example external source data collector 316 is responsible for collecting/receiving the external source data via a subscription, an information publishing service, periodic and/or aperiodic queries, etc. In some examples, the external source data collector 316 is equipped with user login/account information that gives the external source data collector 316 access to particular ones of the external data sources 145. The remote safety manager 130 uses the collected/received information to further evaluate the safety/security of the respective portable electronic device users (e.g., the first user 150A, the second user 150B, third user 150C, etc.) (See FIG. 1) and to supplement the functionality of the safety monitors (e.g., the first, second, and third safety monitors 120A, 120B, 120C) in the manner described below. In some examples, one or more other devices associated with the user 150A (e.g., the example wearable sensor(s) 211A (a smartwatch), the example stationary sensor(s) 211B, sensor(s) disposed on other portable electronic devices 211C, etc.,) also transmit information to the remote safety manager 130. In some such examples, the remote safety manager 130 is capable of communicating directly with such other devices and querying such devices for information.

In some examples, the example remote threshold alert level monitor 312 tracks the threshold alert level corresponding to a current context profile in use at the remote monitor 110A. In some such examples, the remote threshold alert level monitor 312 may replicate adjustments to the threshold alert level made by the threshold alert level monitor 202 (see FIG. 2) of the safety monitor 110A. In some examples, the example remote threshold alert level adjuster 311 may adjust the threshold alert level based on information received from one or more of the external data sources 145 and/or one or more other portable electronic devices (e.g., the second portable electronic device 120B, the third portable electronic device 120C). In some examples, the remote threshold alert level monitor 312 monitors any of the current usage attributes supplied by the safety monitor 110A, and the external source data to determine when the threshold alert level has been satisfied (and/or is to be adjusted). In some examples, remote threshold alert level monitor 312 monitors the current usage attributes supplied by the safety monitor 110A, the external data supplied by the external data sources 145, and/or external data supplied by other safety monitors (e.g., the second safety monitor 110B, the third safety monitor 110C) and notifies the remote threshold alert level adjuster 311 when the threshold alert level is to be adjusted based on both types of information. In response, the remote threshold alert level adjuster 311 adjusts the threshold alert level. The remote threshold alert level monitor 312 determines when the threshold alert level has been satisfied (based on sensor information and/or external source data) and notifies the remote safety alert actuator 314 that an alert is to be actuated. In some examples, the remote threshold alert level monitor 312 and the remote safety alert actuator 314 notify the threshold alert level monitor 202 (see FIG. 2) and the safety alert actuator 204 (see FIG. 2) of the safety monitor 110A when the threshold alert level is adjusted and/or a safety alert has been actuated. In some examples, the threshold alert level monitor 202 and/or the safety alert actuator 204 incorporate the threshold alert level and safety alert information into the safety monitoring operations performed by the safety monitor 110A.

In some examples, the past usage history collector 302 collects past usage history data from the safety monitor 120A, the current usage data collector 306 collects current usage data from the safety monitor 120A, and the example usage context history collector/analyzer 328 collects usage context profile data from the remote safety monitor 120A. As described above, the usage context profile data, the past usage history data, and/or the current usage data can include the user's emergency contact information, the user's call history, the user's movement data, the user's location information, the user's browser history, the user's exercise history, the user's medical information, the routines (e.g., daily, weekly, monthly (or aperiodic) routines) the user's calling habits, texting habits, media access habits, web-surfing habits, social media contacts, social media habits, restaurant preferences, all (or some) of the information supplied by the on-device sensor(s) 210A-210H, and the off-device sensor(s) 211A-211C, and/or any other information the users (e.g., the first user 150A, the second user 150B, the third user 150C) agree to share. In some examples, the amount of information shared by the users may be identified in service level agreements between the users and the operators of the safety system 100.

In some examples, the example supplemental usage context history analyzer 330, the example supplemental past usage history analyzer 304, the external data source analyzer 318, and the example current usage data analyzer 308 of the example remote safety manager 130 analyze the collected information (collectively or individually) and, based on the analyses, generate and/or revise/update usage context profiles and/or generate and/or revise/update threshold alert levels to be associated with any of the usage context profiles. In some examples, the usage context profiles are further generated/revised/updated based on external source data. In some such examples, the communication controller 326 transmits the revised/updated usage context profiles to the safety monitor 110A for usage by the safety monitor 110A in the manner described above. In some examples, the supplemental past usage history analyzer 304, the supplemental usage context history analyzer 330, the usage context profile collector/analyzer 332, the external data source analyzer 318, and/or the current usage data analyzer 308, may use machine learning techniques, neural networks, artificial intelligence, programmed logic, etc., to analyze the supplied information. In this manner, the remote safety manager 130 uses the on-going collection of information from the safety monitor 110A as feedback in understanding (and even predicting) the habits, routines, preferences, etc., of the user 150A.

In some examples, the current usage data analyzer 308 analyzes the current usage data collected by the current usage data collector 306 and compares the current usage data to the usage context profiles obtained by the example usage context profile collector/analyzer 332 to identify a usage context profile having a usage context that corresponds to the current usage data. When a corresponding usage context profile is identified, the current usage data analyzer 308 extracts the threshold alert level, corresponding abnormal activity usage attributes to be monitored in connection with the current usage, etc. from the corresponding usage context profile and supplies the extracted information to the remote threshold alert level monitor 312 for monitoring the safety of the user 150A.

In some examples, the example remote safety manager 130 and/or the example safety monitor 110A (see FIG. 1) also use information supplied by one or more external data sources 145 (e.g., the example social media services/platforms 145A, the example government services/databases 145B, the example private/commercial services/databases 145D, the example communication network/information control centers 145E, and/or information supplied by other portable electronic devices (e.g., the second portable electronic device 120B, the third portable electronic device 120C, etc.). In some such examples, the safety monitor 110A and/or the remote safety manager 130 accesses the external data sources 145 to obtain information about, for example, locations occupied by the portable electronic device 120A during the daily routine of the user 150A. In some such examples, one or more of the external data sources 145 (e.g., law enforcement agencies, online message boards, real estate websites, real estate agencies, crime watch websites, etc.) provide data identifying locations having a high incidence of violent crimes and/or identifying locations having a low incidence of violent crimes. In some examples, the safety monitor 110A and/or the remote safety manager 130 use the crime statistics to adjust the threshold alert levels associated with the usage context profiles associated with the locations and/or to generate any of the information included in the usage context profiles. In some examples, the external data sources 145 supply information to the safety monitor 110A and/or the remote safety manager 130 indicating that other portable electronic device users (e.g., the second user 150B, the third user 150C, etc.) have reported (at an earlier time) a location as being potentially dangerous.

In some examples, the external data sources 145 and/or the safety monitors 110B, 110C supply information to the safety monitor 110A and/or the remote safety manager 130 indicating that an event happening in real-time is causing a location to be a high risk area (e.g., a riot, a shooting, a car accident, a terrorist event, a fire, a natural disaster, an explosion, a mass transit accident, etc.). In some such examples, the example social media platform 145A may determine that numerous users of the platform have posted information concerning such an event in a location currently occupied by the user 150A. In some such examples, the public utility 145D may notify the safety monitor 110A or the remote safety manager 130 that street lamps on a street currently being traversed by the user 150A are inoperable due to an electricity outage (thereby possibly increasing risk to the user 150A). In some examples, the external data sources 145 may include a law enforcement agency 145B. In some such examples, the law enforcement agency may supply information identifying a crime (e.g., a shooting, a mugging, a riot, etc.) happening in real-time near the user 150A (e.g., within a threshold distance of the user 150A, within a same building as the user 150A, at a same venue as the user 150A, etc.). The real-time events described herein represent only a few of the many types of real-time events that can be detected and reported by an external source to the remote safety manager 130.

In some such examples, any or all of the real-time event information supplied by one or more of the external data sources 145 to the remote safety manager 130 is supplied to the example real-time event analyzer 320. The real-time event analyzer 320 can respond by causing the remote safety alert actuator 314 to generate an alert, or by causing the example remote threshold alert level adjuster 311 to adjust the threshold alert level (either up or down depending on the real-time event information). In some examples, the remote safety manager 130 analyzes the external data supplied by the external data sources 145 to evaluate the criticality of external data and, when found to be of a highly critical nature, to immediately transmit the critical information to the safety monitor 110A for use in revising/fine-tuning the threshold alert levels associated with one or more usage context profiles that may be affected by the information. In some examples, the past usage history and data analyzer 222 (see FIG. 2) of the example safety monitor 110A (see FIG. 2) receives the critical information and uses the information to revise/fine-tune the threshold alert levels associated with one or more of the usage context profiles affected by the information. In some examples, when the external data is not critical, the remote safety manager 130 may transmit the information to the safety monitor 110A at a later time. In some examples, the remote safety manager 130 filters the external data from the external data sources 145 and only supplies information relevant to the portable device 120A to the safety monitor 110A.

As described above, in some examples, the remote safety alert actuator 314 actuates a safety alert based on information supplied by the safety monitor 110A, information supplied by one or more of the external data sources 145 and/or information supplied by one or more other safety monitors 110B, 110C. In some such examples, the remote safety alert actuator 314 notifies the assistance request manager 322 which responds by summoning assistance from law enforcement agencies, fire departments, private security firms, nearby portable device users, emergency contacts associated with the electronic portable device 120A, a social media site, etc.) In some examples the summons for assistance is transmitted by the communication controller 326 to the communication network(s) 144 for transmission to the intended recipients. The summons for assistance can include the identity of the user 150A, the location of the user 150A, information about the type of danger confronting the user 150A, information about traffic conditions in the vicinity of the user, etc. The information included in the summons can be extracted from the current usage data (or any other data) collected by the example current usage data collector 306 and/or from the communication network information/control centers 145E (e.g., the communication network information/control centers can supply the location of the portable electronic device) or any of the external data sources 145. In some examples, the assistance request manager 322 may also (or instead) cause instructions to be transmitted to the safety monitor 110A to actuate one or more of the example output devices 216 (see FIG. 2) of the portable electronic device 120A.

In some examples, the example portable device query engine 310 sends queries to safety monitor 110A. In some examples, the queries include requests for additional usage data, requests to be presented to the user 150A regarding a current context in which the portable electronic device 120A is being used, inquiries to be presented to the user 150A about the user's current state of safety (e.g., whether the user feels threatened or safe, etc.). Any of the information supplied by the safety monitor 110A is supplied to one or more of the real-time event analyzer 320, the supplemental usage context history analyzer 330, the example supplemental past usage history analyzer 304, the example current usage data analyzer 308, etc., for analysis, and if needed, adjustment of a usage context profile, adjustment of a threshold alert level, actuation of a safety alert, etc.

In some examples, the safety system 100 (see FIG. 1) includes multiple remote safety managers 130 disposed at any of a variety of locations ((e.g., in the cloud, at a communication services provider facility, at a network gateway, etc.) and includes some or all of the components of FIG. 3. In some examples, the multiple remote safety managers 130 may be operable at a same time or at different times, or more of the multiple remote safety managers 130 may be used in the event that a primary multiple remote safety manager 130 fails, and/or the primary multiple remote safety managers 130 may operate in a distributed (e.g., different ones of the multiple remote safety managers 130 perform different ones of operations described above).

In some examples, the remote safety manager 130 supplies information to the one or more external data sources 145. In some such examples, the remote safety manager 130 may supply usage data received from any of the example safety monitors (e.g., the first safety monitor 110A, the second safety monitor 110B, the third safety monitor 110C, etc.) to the external data sources 145. Example usage data supplied to the external data sources 145 can include any of the past usage history data and/or current usage data (e.g., sensor-supplied information, information supplied by one or more of the input devices, information about the device usage, etc.). In some examples, the remote safety manager 130 evaluates (analyzes, aggregates, tallies, identifies trends, etc.) the usage data, real-time event data, external source data, data received from the other portable electronic devices 120B, 120C to identify on-going events or make predictions of future events (e.g., to identify/predict areas of high/low crime, to identify/predict the occurrence of natural disasters, to identify crowds of people, to identify/predict a riot, to identify/predict a mass transit event, to identify/predict an electricity outage, to identify/predict a streetlight outage, etc.). The remote safety manager 130 can generate reports containing the evaluations/predictions and transmit the reports to any of the external data sources 145 or any other desired entity.

In some examples, the real-time event analyzer 320 is configured to receive real-time event data from the external source data collector 316. When the real-time event analyzer 320 determines that the user 150A is threatened or otherwise in jeopardy based on the real-time event data, the real-time event analyzer 320 actuates the remote safety alert actuator 314 which responds by summoning assistance (or actuating devices (e.g., sirens, surveillance cameras, etc.) in the vicinity of the portable electronic device 120A) in the manner described above.

In some examples, the example remote safety manager 130 acts as a back-up resource for the safety monitor 110A when the safety monitor 110A becomes inoperable. In some such examples, the safety monitor 110A may be operating at a low threshold alert level when the communications controller 326 of the remote safety manager 130 determines that connectivity with the safety monitor 110A has been lost. In some such examples, the communications controller 326 can notify the remote safety alert actuator 314 (and/or the remote threshold alert level monitor 312) which can respond by actuating a safety alert. In some examples, before actuating a safety alert in response to losing connectively, the remote threshold alert level monitor 312 may evaluate, for example, a battery charge usage attribute received from the safety monitor 110A prior to the loss of connectivity. If the battery charge attribute was very low when connectivity was lost, the remote threshold alert level monitor 312 may, instead of actuating a safety alert, cause the remote safety alert actuator 314 to issue a "possible safety alert." In response to the "possible safety alert," the example assistance request manager 322 can respond by transmitting a message to one or more sources of assistance indicating that the user 150A is possibly in danger and providing any additional information such as, the current location of the user 150A, the circumstances that indicate the user 150A is possibly in danger, etc.). As used herein, sources of assistance include any remote or near-by person, authority, agency (private or public), media, etc., that may be able to render assistance to the user 150A.

In some examples, the example user 150A enters into a service level agreement with an operator of the safety system 100. The service level agreement can identify information about the user's portable electronic device 120A, types of attributes to be monitored, types of information to be shared with external data sources, types of assistance to be obtained in the event of an emergency, etc. The service level agreement can additional identify other devices owned/operated by the user 150A that will provide data to (and/or otherwise be accessible to) the remote safety manager 130.

The safety system 100, the remote safety manager 130 and the safety monitor 110A are generally described as being used to monitor the safety of the user of a portable device and to summon assistance on behalf of the user 150A when needed. The safety of the user is not limited to situations in which the user is subject to (or at risk of) an assault by another person or entity, but can also include monitoring for situations in which the safety of the user is in peril due to health related issues (e.g., the biological sensor(s) indicate the user 150A is not breathing, the user 150A is suffering a heart attack or cardiac arrest, the user 150A is having an asthma attack, the user 150A is experiencing anaphylactic shock, the user 150A has been injured in a car accident, the user has fallen from a great height, the user has fallen and has not gotten back up, etc.

In some examples, instead of supplementing and/or replicating the safety monitoring functionality of the example first, second, and third safety monitors 120A, 120B, 120C (see FIG. 2), the example remote safety manager 130 performs the bulk of data collection and data analysis whereas the first, second, and third safety monitors 120A, 120B, 120C primarily operate to monitor current usage attributes supplied via the sensors 210 to determine whether a threshold alert level has been satisfied. In some such examples, the remote safety manager 130 is responsible for collecting data from the external data sources 145 and for collecting usage data and usage history from the first, second, and third safety monitors 120A, 120B, 120C of the first, second and third portable electronic devices 110A, 110B, 110C. In some such examples, the remote safety manager 130 uses any of machine learning, artificial intelligence, neural networks, programmed logic, etc. to analyze the collected data and to develop a set of usage context profiles for each of the first, second, and third safety monitors 120A, 120B, 120C. The remote safety manager 130 supplies the usage context profiles to the first, second, and third safety monitors 120A, 120B, 120C for usage in monitoring the safety of the user 150A in the manner described above (e.g., depending on the current usage attributes, a corresponding usage context profile and a corresponding threshold alert level are identified, and the usage attributes associated with the threshold alert level are monitored to determine whether the corresponding threshold alert level has been satisfied).

In some examples, the example remote safety manager 130 can commandeer control of (and/or request information from) sensor(s) disposed off of the first, second, and/or third portable devices 120A, 120B, 120C that are located in proximity of the users 150A, 150B, 150C. Such off-device sensors can include, for example, a surveillance camera, a surveillance microphone, a fire alarm, a heat sensor, a smoke sensor, a motion sensor, etc. In some examples, the remote safety manager 130 analyzes information collected from the sensor(s) to determine if an abnormal activity is detected and, if so, actuates a safety alert. In some such examples, the remote safety manager 130 can take control of devices in the vicinity of the user 150A when a safety alert is actuated (e.g., to transmit a command to actuate a stationary siren in the vicinity of the user, to transmit a command to actuate a street lamp in the vicinity of the user, to transmit a command (or message) to other portable electronic devices 150B, 150C in the vicinity of the user 150A), etc. In some examples, the example remote safety manager 130 can commandeer control of (and/or request information from) sensor(s) disposed off of the first, second, and/or third portable devices 120A, 120B, 120C that are located in proximity of the users 150A, 150B, 150C in response to any of the first, second, and/or third portable devices 120A, 120B, 120C coming within a threshold distance of the such sensors. In some examples, the safety manager 130 requests control of such sensors via the assistance request manager 322.

In some examples, the safety monitoring functionality of the safety system 100 is performed in a distributed manner that relies primarily upon the monitoring functionality of the example first, second, and third safety monitors 120A, 120B, 120C (see FIG. 2). In some such examples, the first, second, and third safety monitors 120A, 120B, 120C perform the data collection, analysis and monitoring operations described with reference to FIG. 2. In some such examples, the first, second, and third safety monitors 120A, 120B, 120C communicate with each other and with the external data sources 145 to monitor the safety of the users 150 and notify authorities (and/or others) when assistance is required.

In some examples, the current usage data includes data collected at the sensors as well as data collected from any of the external data sources. In some examples, the safety manager and/or the safety monitor cause a safety alert to be actuated in response to external source data received from one or more of the external data sources as well as (or instead of) sensor-supplied information.

While an example manner of implementing the safety system 100 of FIG. 1 is illustrated in FIG. 2, one or more of the elements, processes and/or devices illustrated in FIG. 2 may be combined, divided, re-arranged, omitted, eliminated and/or implemented in any other way. Further, the example threshold alert level monitor 202, the example safety alert actuator 204, the example usage context generator 206, the example false alarm evaluator 208, the example sensor(s) 210A-210H, the example wearable sensor(s) 211A, the example stationary sensor(s) 211B, the example portable device sensor(s) 211C, the example clock 212, the example user input devices 214, the example output devices 216, the example communication devices 218, the example communication controller 219, the example threshold alert level adjuster 221, the example current usage detector 220, the example past user history analyzer 222, the example past usage history storage 224, the example usage context profile storage 226, the example threshold override device 228, and/or, more generally, the example first, second and third safety monitors 110A, 110B, 110C and the example first, second and third portable electronic devices 120A, 120B, 120C, may be implemented by hardware, software, firmware and/or any combination of hardware, software and/or firmware. Thus, for example, any of the example threshold alert level monitor 202, the example safety alert actuator 204, the example usage context generator 206, the example false alarm evaluator 208, the example sensor(s) 210A-210H, the example wearable sensor(s) 211A, the example stationary sensor(s) 211B, the example portable device sensor(s) 211C, the example clock 212, the example user input devices 214, the example output devices 216, the example communication devices 218, the example communication controller 219, the example threshold alert level adjuster 221, the example current usage detector 220, the example past user history analyzer 222, the example past usage history storage 224, the example usage context profile storage 226, the example threshold override device 228, and/or, more generally, the example first, second and third safety monitors 110A, 110B, 110C and the example first, second and third portable electronic devices 120A, 120B, 120C could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first, second, and third safety monitors 110A, 110B, 110C, the example first, second, and third portable electronic devices 120A, 120B, 120C, the example threshold alert level monitor 202, the example safety alert actuator 204, the example usage context generator 206, the example false alarm evaluator 208, the example sensor(s) 210A-210H, the example wearable sensor(s) 211A, the example stationary sensor(s) 211B, the example portable device sensor(s) 211C, the example clock 212, the example user input devices 214, the example output devices 216, the example communication devices 218, the example communication controller 219, the example threshold alert level adjuster 221, the example current usage detector 220, the example past user history analyzer 222, the example past usage history storage 224, the example usage context profile storage 226, and/or the example threshold override device 228, is/are hereby expressly defined to include a non-transitory computer readable storage device or storage disk such as a memory, a digital versatile disk (DVD), a compact disk (CD), a Blu-ray disk, etc. including the software and/or firmware. Further still, the example first, second, and third safety monitors 110A, 110B, 110C and example first, second and third portable electronic devices 120A, 120B, 102C of FIG. 1 may include one or more elements, processes and/or devices in addition to, or instead of, those illustrated in FIG. 2, and/or may include more than one of any or all of the illustrated elements, processes and devices.

While an example manner of implementing the safety system 100 of FIG. 1 is illustrated in FIG. 3, one or more of the elements, processes and/or devices illustrated in FIG. 3 may be combined, divided, re-arranged, omitted, eliminated and/or implemented in any other way. Further, the example past usage history collector 302, the example supplemental past usage history analyzer 304, the example current usage data collector 306, the example current usage data analyzer 308, the example portable device query engine 310, the example remote threshold alert level monitor 312, the example remote safety alert actuator 314, the example external source data collector 316, the example external data source analyzer 318, the example real-time event analyzer 320, the example assistance request manager 322, the example communication network data collector 324, the example communication controller 326, the example context usage history collector 328, the example supplemental context usage history analyzer 330, the example usage context profile collector/analyzer 332, the example storage(s) 334, and/or, more generally, the example remote safety manager 130, may be implemented by hardware, software, firmware and/or any combination of hardware, software and/or firmware. Thus, for example, any of the example past usage history collector 302, the example supplemental past usage history analyzer 304, the example current usage data collector 306, the example current usage data analyzer 308, the example portable device query engine 310, the example remote threshold alert level monitor 312, the example remote safety alert actuator 314, the example external source data collector 316, the example external data source analyzer 318, the example real-time event analyzer 320, the example assistance request manager 322, the example communication network data collector 324, the example communication controller 326, the example context usage history collector 328, the example supplemental context usage history analyzer 330, the example usage context profile collector/analyzer 332, the example storage(s) 334, and/or, more generally, the example remote safety manager 130 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example safety manager 130, the example past usage history collector 302, the example supplemental past usage history analyzer 304, the example current usage data collector 306, the example current usage data analyzer 308, the example portable device query engine 310, the example remote threshold alert level monitor 312, the example remote safety alert actuator 314, the example external source data collector 316, the example external data source analyzer 318, the example real-time event analyzer 320, the example assistance request manager 322, the example communication network data collector 324, the example communication controller 326, the example context usage history collector 328, the example supplemental context usage history analyzer 330, the example usage context profile collector/analyzer 332, the example storage(s) 334, and/or, more generally, and/or the example remote safety manager 130, is/are hereby expressly defined to include a non-transitory computer readable storage device or storage disk such as a memory, a digital versatile disk (DVD), a compact disk (CD), a Blu-ray disk, etc. including the software and/or firmware. Further still, the example safety manager 130 of FIG. 1 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example first, second and third safety monitors 110A, 110B, 110C of FIG. 1 and FIG. 2 are shown in FIGS. 4-9, 11 and 12. In these examples, the machine readable instructions comprise a program for execution by a processor such as the processor 1312 shown in the example processor platform 1300 discussed below in connection with FIG. 13. The program may be embodied in software stored on a non-transitory computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 4-9, 11 and 12, many other methods of implementing the example first, second and third safety monitors 110A, 110B, 110C may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

Figure 10:
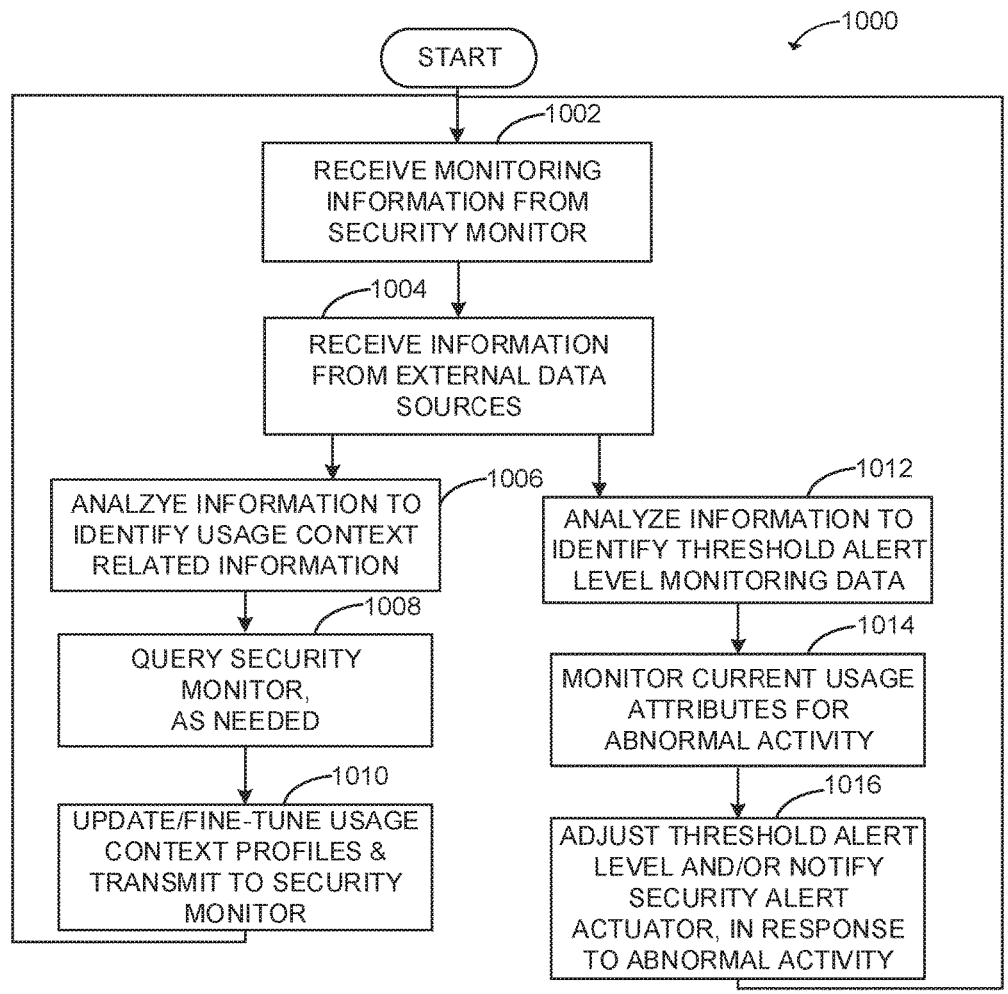
FIG. 10 is a flow chart representative of example machine readable instructions which may be executed to implement the example remote safety manager of FIG. 1 and FIG. 3.

Flowcharts representative of example machine readable instructions for implementing the example remote safety manager 130 of FIG. 1 and FIG. 3 are shown in FIGS. 10, 11 and 12. In these examples, the machine readable instructions comprise a program for execution by a processor such as the processor 1412 shown in the example processor platform 1400 discussed below in connection with FIG. 14. The program may be embodied in software stored on a non-transitory computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 10, 11, and 12, many other methods of implementing the example remote safety manager 130 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 4:
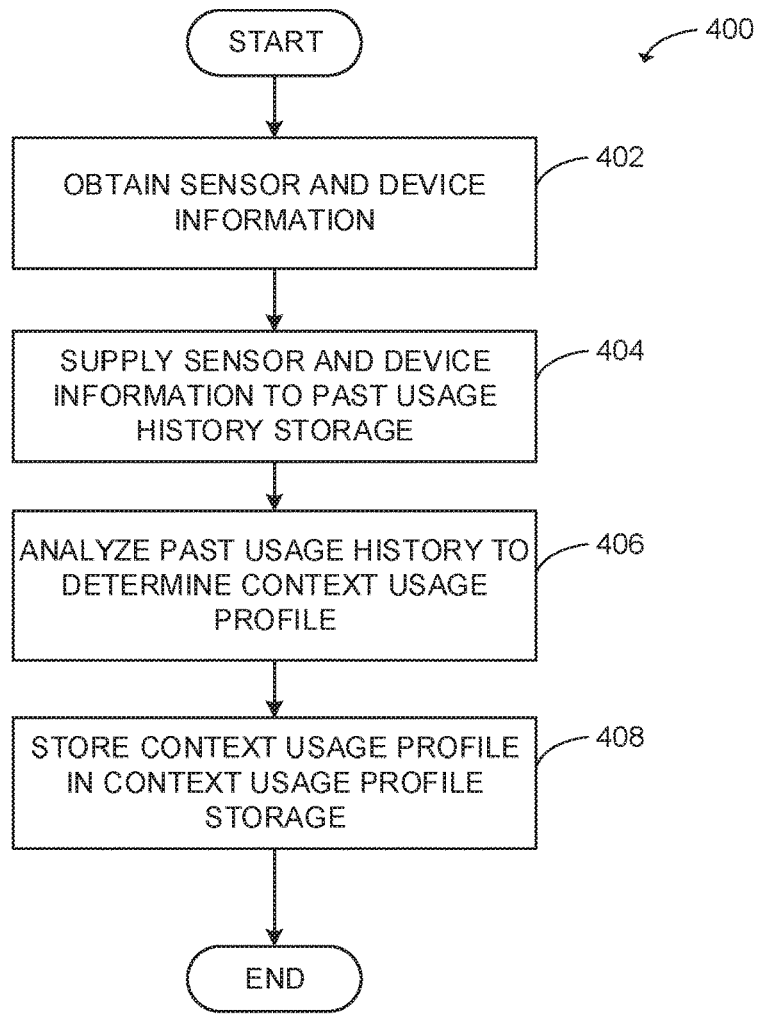
FIG. 4 is a flow chart representative of example machine readable instructions which may be executed to implement the example safety monitor of FIG. 1 and FIG. 2.

The program 400 of FIG. 4 begins at block 402 at which the example current usage detector 220 of the example usage context generator 206 obtains current usage data from any of the example sensor(s) 210A-210H (e.g., location information from the example location sensor 210H, motion information from the example motion sensor(s) 210E, etc.) time information from the example clock 212, date information from the clock 212, and/or other usage information stored on the portable electronic device 110A (e.g., contacts information, web-usage history, call history, viewing habits, listening habits, etc.). The current usage detector 220 supplies the obtained information to the past usage history storage 224 (block 404). The past usage history analyzer 222 analyzes the information stored in the past usage history storage 224 to determine (and/or fine tune) contexts in which the portable electronic device 120A is used (usage contexts) and corresponding usage context profile information (block 406). In some examples, the corresponding usage context profile information includes a threshold alert level, a usage attribute, and abnormal activity usage attributes. In some examples, the past usage history analyzer 222 additionally uses data obtained from the remote safety manager 130 (e.g., external source data from the external data sources 145, results of analyses performed by any of the external data source analyzer 318, the supplemental past usage history analyzer 304, the example supplemental usage context history analyzer 330, the example current usage data analyzer 308, etc.) to determine (and/or fine tune) the usage contexts and to generate the corresponding usage context profiles. The past usage history analyzer 222 stores the usage context profiles in the usage context profile storage 226 (block 408). Thereafter, the process returns to the block 402 and is repeated until the safety monitor 110A is deactivated.

The process of FIG. 4 is continuously, semi-continuously, periodically or aperiodically repeated such that the past usage history analyzer 222 continues to adjust/fine tune the usage context profiles based on the continuous or semi-continuous collection of past usage history data, external source data, sensor data, etc. In some examples, a set of default usage context profiles (e.g., a usage context profile corresponding to times when the user 150A is at home, a usage context profile corresponding to times when the user 150A is at work, a usage context profile corresponding to times when the user 150A is at a health club, etc.) can be initially stored in the usage context profile storage 226 and then revised/fine-tuned as past usage history data is collected. In some examples, the safety monitor 110A can supply a user interface by which the user 150A can initially assign usage threshold alert levels to the usage context profiles.

Figure 5:
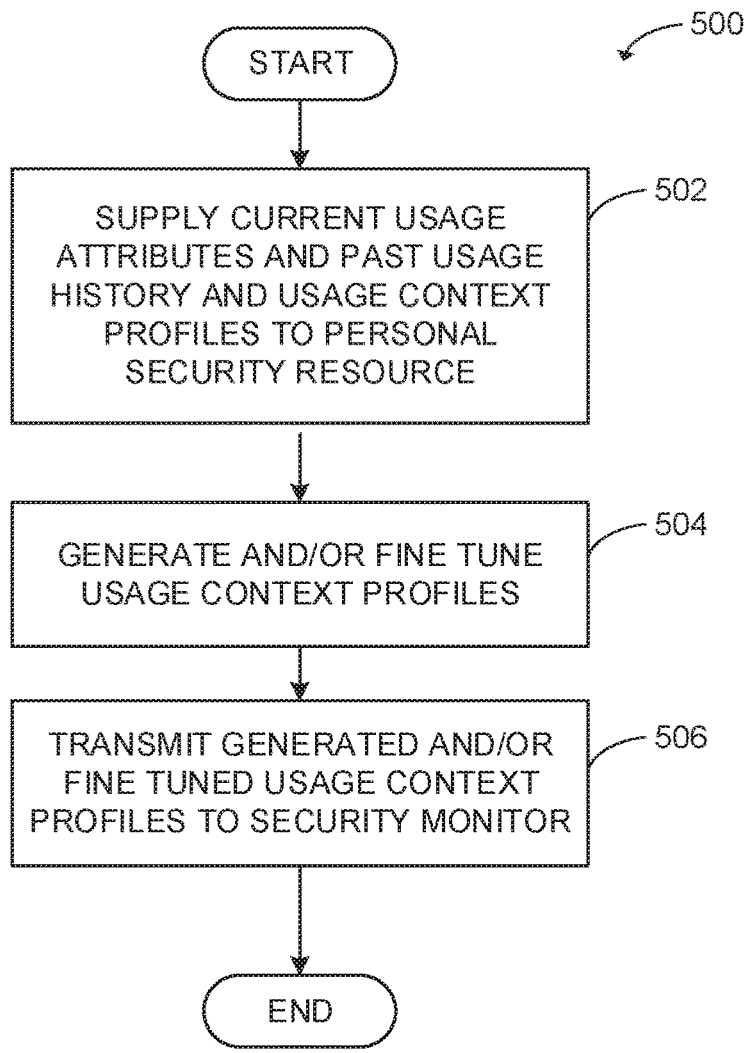
FIG. 5 is a flow chart representative of example machine readable instructions which may be executed to implement the example safety monitor and the example remote safety manager of FIG. 1, FIG. 2, and FIG. 3.

The program 500 of FIG. 5 begins at block 502 at which the example past usage history analyzer 222 of the usage context history generator 206 supplies any of the current usage attributes collected by the current usage detector 220, the past usage history stored in the past usage history storage 224, and/or the context profiles stored in the usage context profile storage 226 to the remote safety manager 130. The remote safety manager 130 uses the supplied information to generate (and/or fine tune) the usage context profiles (block 504). In some examples, the remote safety manager 130 additionally uses data collected from any of the public, private, and/or governmental information sources to generate (and/or fine-tune) the usage context profiles. The remote safety manager 130 transmits the newly generated (or fine-tuned) usage context profiles back to the remote safety manager 130 and causes the information to be stored in the usage context profile storage 226 (block 506). The process of FIG. 5 is continuously, semi-continuously, periodically or aperiodically repeated such that the usage context history generator 206 continues to adjust/fine tune the usage context profiles based on the continuous or semi-continuous collection of usage history data.

Figure 6:
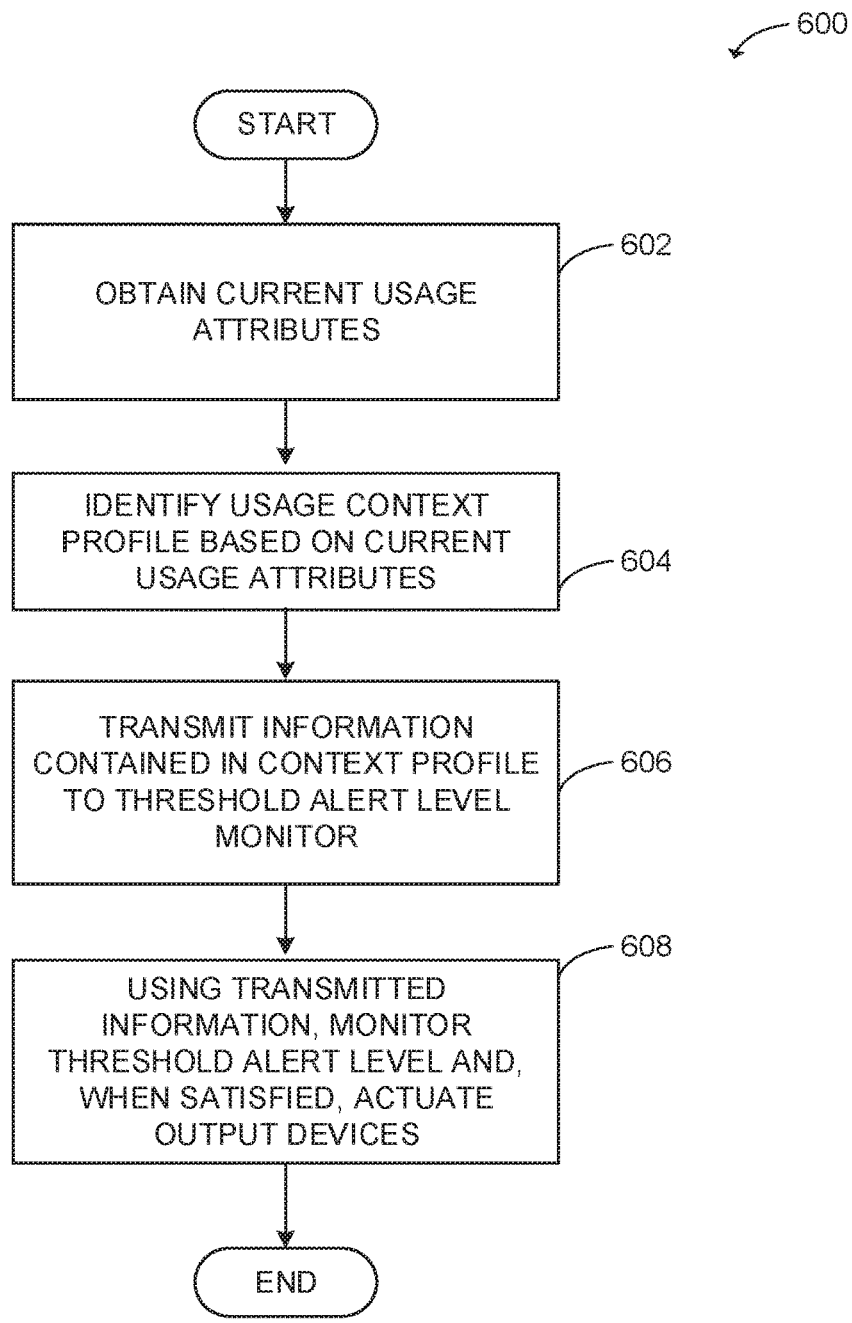
FIG. 6 is a flow chart representative of example machine readable instructions which may be executed to implement the example safety monitor of FIG. 1 and FIG. 2.

The program 600 of FIG. 6 begins at block 602 at which the example current usage detector 220 obtains current usage attributes from the example sensor(s) 224, the clock 212, and/or other information stored on the portable electronic device 120A (e.g., contacts information, web-usage history, viewing habits, listening habits, calling habits, texting habits, email usage habits, etc.) and, in some examples, information from the remote safety manager 130. In some examples, the information from the remote safety manager 130 can include any information from any of the external data sources 145 (e.g., governmental, private/commercial, public and/or communication network).

The example current usage detector 220 compares the current usage attributes to the usage attributes associated with one or more of the usage context profiles and identifies a context profile having a threshold number of usage attributes that match the current usage attributes (block 604). The current usage detector 220 causes the threshold alert level and the abnormal activity usage attributes associated with the matching usage context profile to be transmitted to the threshold alert level monitor 202 (block 606).

The example threshold alert level monitor 202 begins monitoring one or more of the abnormal activity usage attributes transmitted by the current usage context detector 220 (block 608). When a threshold number of the one or more abnormal activity usage attributes are detected, the threshold alert level monitor causes the safety alert actuator 204 to actuate one or more output devices and/or communication devices 218 (block 610). In some examples, the threshold number (and/or values) of abnormal activity usage attributes to be detected before a safety alert is to be actuated is based on whether the threshold alert level is high or low. In some examples, a high threshold alert level will require the detection of a greater number of the abnormal activity usage attributes than a low threshold alert level alert. In some examples, the values/levels corresponding to abnormal activity usage attributes associated with a high threshold alert level will be different than the values/levels corresponding to such attributes associated with a low threshold alert level. In some examples, when the current usage detector 220 transmits the threshold alert level and the abnormal activity usage attributes, the current usage detector 220 will also transmit an order in which the abnormal activity usage attributes are to be detected and/or respective threshold values (e.g., user's heartrate, acceleration of the user's heartrate, amount user is perspiring, change in user's perspiration level, etc.), that respective ones of the abnormal activity usage attributes are to achieve before the abnormal activity usage attributes are to be considered "detected." Thereafter, the program 600 returns to the block 602.

Figure 7:
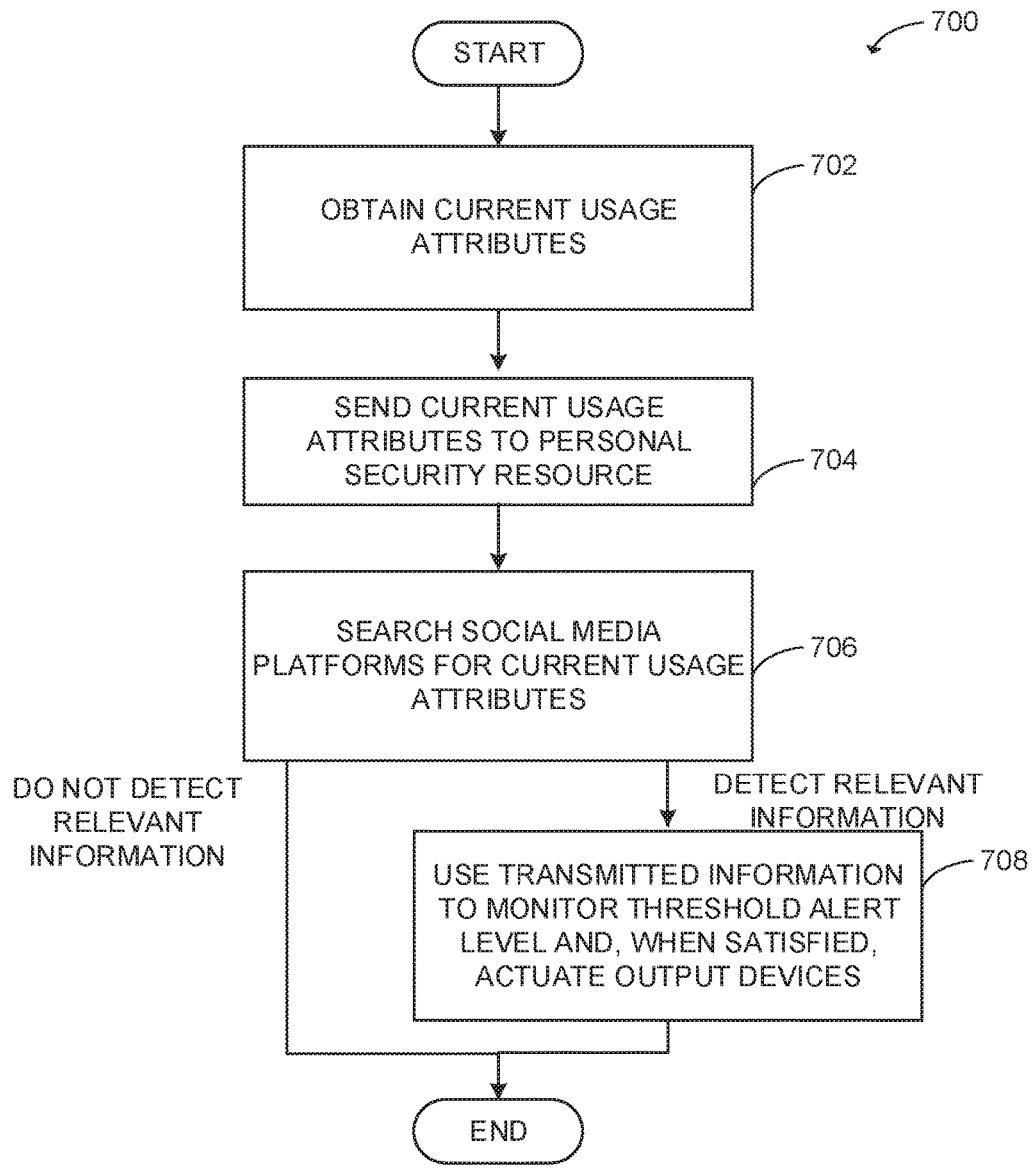
FIG. 7 is a flow chart representative of example machine readable instructions which may be executed to implement the example safety monitor and the example remote safety manager of FIG. 1, FIG. 2, and FIG. 3.

The program 700 of FIG. 7 begins at block 702 at which the example current usage detector 220 obtains current usage attributes from the example sensor(s) 210, the clock 212, and/or other information stored on the portable electronic device 110A (e.g., contacts information, web-usage history, viewing habits, listening habits, calling habits, texting habits, email usage habits, etc.). In some examples, the current usage attributes include an image or video clip and location information. The current usage detector 220 supplies the information to the remote safety manager 130 using any of the output devices 216 and/or communication devices 218 (block 704). The remote safety manager 130 accesses the data collected from the external sources 145 (e.g., a social media service/platform, an Internet search engine, any Internet-based information resource, etc. (e.g., Facebook, Google images, Instagram, Snapchat, Google reviews, Yelp, etc. using an account held by the user 150A and compares the image and/video clip obtained from the safety monitor 110A. In some examples, the remote safety manager 130 determines that the image and/or video clip matches one or more images and/or video clips posted by other users of the social media service/platform. In some such examples, the matching images and/or video clips are associated with a location at which attendees are at risk of injury due to an on-going situation (e.g., a riot, detonation of an explosive in a public place, discharge of a firearm in a public place, a fire, etc.). In response to detecting the matching images/video clips and determining the user is at risk of injury due to the on-going situation, the remote safety manager 130 may transmit one or more messages on behalf of the user (that includes a summons for assistance) to one or more of the user's emergency contacts, to the authorities, etc. In some examples, the remote safety manager 130 may additionally or instead cause the safety monitor 110A of the portable electronic device 120A to transmit one or more messages on behalf of the user 150A and summoning assistance to one or more of the user's emergency contacts, to the authorities, etc. In some examples, the remote safety manager 130 instead causes the threshold alert level monitor 202 of the safety monitor 110A to be set to a low threshold alert level and/or a critical threshold alert level. Thereafter the program 700 ends.

Figure 8:
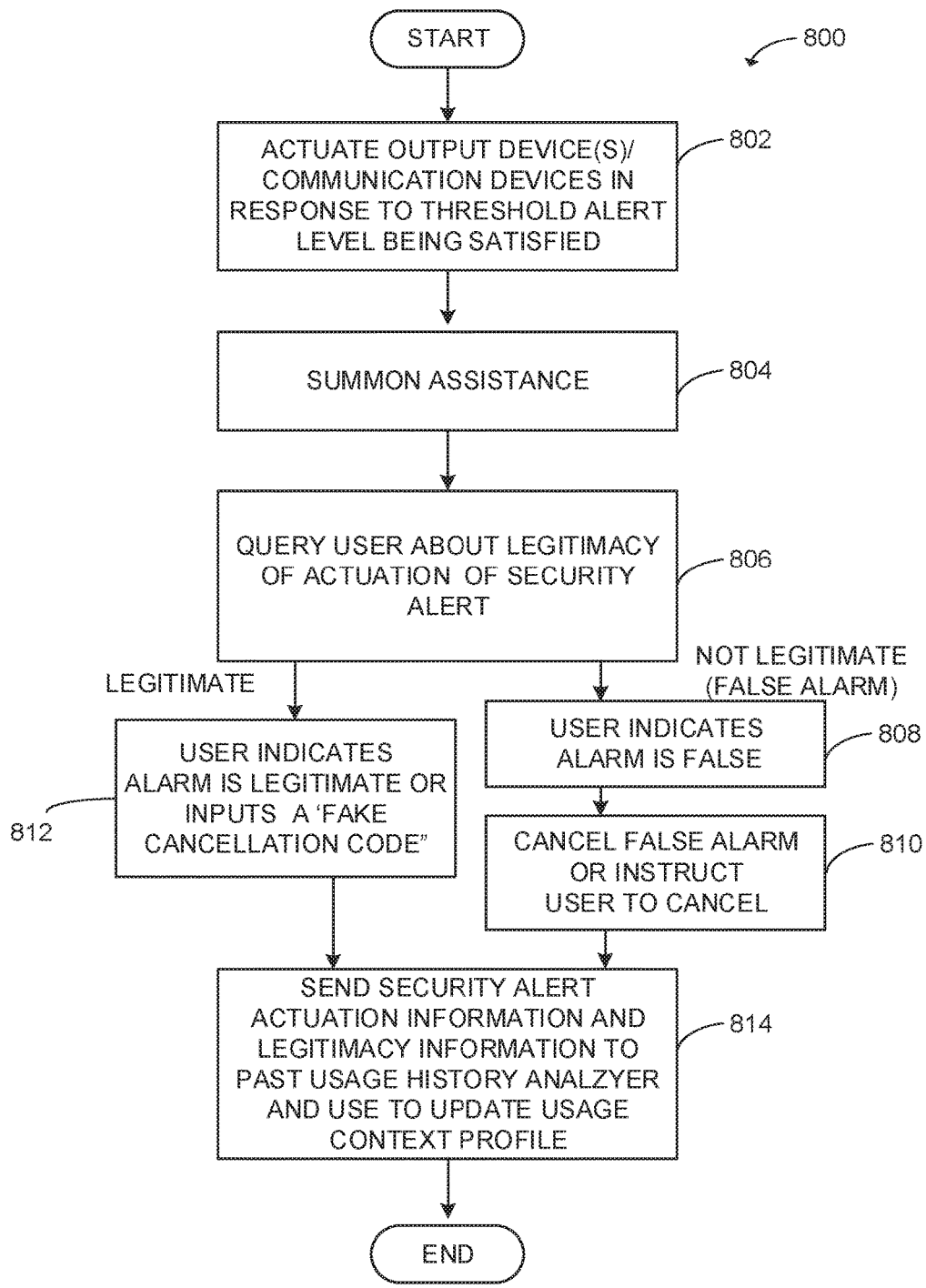
FIG. 8 is a flow chart representative of example machine readable instructions which may be executed to implement the example safety monitor of FIG. 1 and FIG. 2.

The program 800 of FIG. 8 begins at block 802 at which the example threshold alert level monitor 202, in response to detecting an abnormal activity usage attribute, causes the safety alert actuator 204 to actuate the example output devices 216. In response, one or more of the output devices 216 transmits a first message summoning assistance on behalf of the user 150A and/or causes one or more of the output devices 216 of the portable electronic device 120A to emit an alarm, or take any other actions needed to alert others to the user's need for assistance, in the manner described above (block 804). After transmitting the first message, the safety alert actuator 204 causes one of the output devices 216 having display or audio generation capabilities to output a second message notifying the user that the first message has been transmitted (block 806). In some examples, the second message also identifies the parties to whom the first message was transmitted. The second message can further provide the user with an option to identify the safety alert as a false alarm or as a legitimate alert. If the user 150A identifies the safety alert as a false alarm (block 808) by, for example, entering an alarm cancellation code, saying an alarm cancellation phrases, etc., the safety alert actuator 204 responds by causing the one or more output devices to generate a false alarm message to the recipients of the first message (block 810). In some examples, the safety alert actuator 204 instead (or additionally) responds by causing the display or speaker of the portable electronic device 120A to transmit a cancellation message instructing the user to contact the recipients of the first message to cancel the safety alert (also at block 810). If the user indicates that the safety alert is legitimate (block 812), the program ends. In some examples, the user 150A can indicate the alarm was legitimate by entering/speaking a "fake" cancellation code (at the block 812) that will appear to outsiders as authentic but will in fact indicate that the user is under duress. In the event a "fake" cancellation code is detected, the safety alert actuator 204 does not cancel the safety alert and may also cause one of the output devices 216 to output a "fake" message indicating the alert has been canceled. In some such examples, when a "fake" cancellation is detected, the authorities notified of the actuation of the safety alert may be further notified that the safety alert is associated with a critically high emergency.

The false alarm evaluator 208 also notifies the past usage history analyzer 222 of the actuation of the safety alert and provides information regarding whether the safety alert was legitimate or a false alarm (block 814). The past usage history analyzer 222 uses the information to update/fine tune the usage context profiles (also block 814). In some examples, if the safety alert is a false alarm and if the usage context profile being used when the false alarm was generated has caused a threshold number of false alarms in the past, the past usage history analyzer 222 may update/fine tune the usage context profile to make the usage context profile less likely to result in a false alarm. In some such examples, the past usage history analyzer 222 may remove one or more of the abnormal activity usage attributes from the usage context profile. As a result of removing the abnormal activity usage attribute from the usage context profile, the abnormal activity usage attribute will instead be treated as a normal usage attribute and, thus, will not result in actuation of a safety alert when detected. In some examples, the past usage history analyzer 222 can instead revise a criteria associated with an abnormal activity usage attribute in a manner that causes the criteria more difficult to meet.

If the safety alert actuation is not a false alarm, the past usage history analyzer 222 records any (and/or all) the information associated with the safety alert and further records that the safety alert was legitimate. In addition, the information regarding the legitimate safety alert is transmitted to the past usage history analyzer 222 for usage in fine-tuning the context profiles, abnormal activity usage attributes, threshold alert levels, etc. (also at block 814). Thereafter the program 800 ends.

Figure 9:
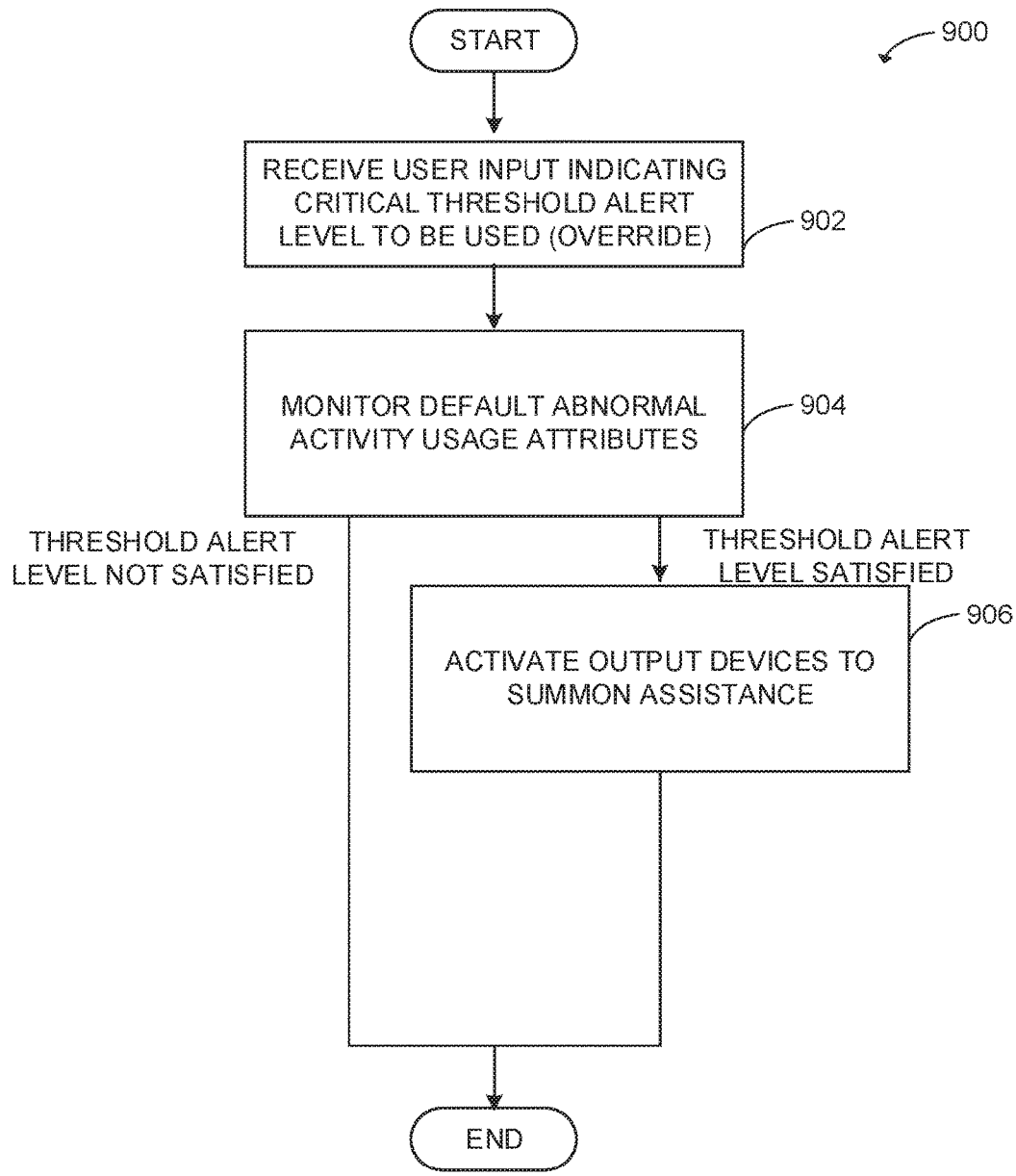
FIG. 9 is a flow chart representative of example machine readable instructions which may be executed to implement the example safety monitor of FIG. 1 and FIG. 2.

The program 900 of FIG. 9 begins at block 902 at which the example safety monitor 110A determines that the user 150A has caused the threshold alert level to be overridden and receives input regarding whether overriding the threshold alert level is to result in a downgrade or an upgrade of the threshold alert level. In some such examples, the user 150A can cause the threshold alert level to be overridden by selecting or more input devices 214 of the portable electronic device 120A and the user 150A can indicate whether the threshold alert level is to be downgraded or upgraded via one or more of the input devices 214. For example, the safety monitor 110A may cause a display and/or a speaker to present an option to override the threshold alert level and/or indicate whether an upgraded or downgrade threshold alert level is to be substituted for the existing threshold alert level. In some examples, the user's input to change the threshold alert level and the upgrade/downgrade information is provided to the example threshold override device 228. The example threshold override device 228 responds by causing the example threshold alert level monitor 202 to begin monitoring a set of abnormal activity usage attributes associated with the upgraded or downgraded threshold alert level (block 904). In some examples, the threshold alert level monitor 202 identifies the set of abnormal activity usage attributes to be monitored by consulting the usage context profile storage 226.

Thereafter, the example threshold alert level monitor 202, upon detecting the abnormal activity usage attribute being monitored and/or detecting that the abnormal activity usage attribute has reached a threshold value, the example safety alert actuator 204 causes one or more of the example output devices 216 and/or example communication devices 218 to summon assistance on behalf of the user 150A in the manner described above (block 906). Thereafter the program 900 ends.

The program 1000 of FIG. 10 begins at block 1002 at which the remote safety manager 130 obtains, via the example communication network(s) 144, information from the example safety monitor 120A. The obtained information can include current usage attributes detected at the example sensor(s) 210, past usage history data, usage context profile information, device usage information (e.g., contacts information, web-usage history, viewing habits, listening habits, calling habits, texting habits, email usage habits, etc.) The remote safety manager 130 also receives information from external data sources 145 (e.g., the example social medium platforms/services 145A, the example governmental services/databases 145B, the example private/commercial services/databases 145C, the example public services/databases 145D, the example communication network information centers 145E, etc.) (block 1004). In some examples, the example external source data collector 316 is responsible for collecting/receiving the external source data via a subscription, an information publishing service, periodic and/or aperiodic queries, etc. In some examples, the example external source data collector 316 of the remote safety manager 130 is equipped with user login/account information that permits the external source data collector 316 access to particular ones of the external data sources 145. Any of the current usage data analyzer 308, the supplemental past usage history analyzer 304, the example supplemental usage context history analyzer 330, the external data source analyzer 318, the real-time event analyzer 320, and/or the usage context profile collector/analyzer 332 analyze the obtained information. In some examples, based on the obtained information and/or the analysis of the obtained information, and/or based on a default set of queries, the example portable device query engine 310 transmits additional queries/requests for additional information that may be stored in the portable electronic device 110A and/or entered by the user 150A (block 1008). Based on the analyses and the responses to the queries, the usage context profile updates/fine-tunes the usage context profiles (block 1010). In some examples, the updated/fine-tuned usage context profiles are transmitted by the remote safety manager 130 to the safety monitor 110A for storage in the example usage context profile storage 226 (also block 1010).

Referring still to FIG. 10, in some examples, the example remote threshold alert level monitor 312 analyzes the obtained information to identify a current monitoring threshold alert level in use at the safety monitor 110A (block 1012). The remote threshold alert level monitor 312 also monitors the current usage attributes to determine whether any abnormal activity is detected (block 1014). In some examples, in response to detecting an abnormal activity, the remote threshold alert level monitor 314 adjusts the threshold alert level and/or notifies the remote safety alert actuator 314 that a safety alert is to be actuated, in accordance with the usage context profile currently in use at the safety monitor 110A (block 1016). In some examples, the remote threshold alert level monitor 312 detects an abnormal activity and, in response, notifies the example remote threshold alert level adjuster 311. In some examples, the remote threshold alert level adjuster 311 notifies the past usage history and data analyzer 222 that the threshold alert level currently in use at the safety monitor 110A should be should be changed (e.g., upgraded or downgraded) without delay. In some such examples, the past usage history and data analyzer 222 causes the threshold alert level adjuster 221 to change the threshold alert level (or an aspect of the threshold alert level) currently being used by the threshold alert level monitor 202. Thus, the remote safety manager 130 can dynamically adjust the threshold alert level, the threshold alert level values, the abnormal usage attributes to be monitored, the number of abnormal usage attributes required to actuate a safety alert, etc., in use at the safety monitor 110A. After the blocks 1010, and 1016, the program 1000 returns to the block 1002 to continue updating the usage context profiles and to continue performing safety monitoring activities.

The program 1100 of FIG. 11 and the program 1200 of FIG. 12 are intended to illustrate different ways in which the safety monitoring system 100 can respond to detection of a usage attribute that can be (but is not always) associated with an abnormal condition. Referring to FIG. 11, the program 1100 begins at a block 1102 at which the example safety monitor 110A (see FIG. 1 and FIG. 2) detects a concussive sound of a decibel level that is typically associated with detonation of an explosive device. Assuming the usage context is such that a concussive alert is evidence of danger to the user (e.g., the user is not at an amusement park, the concussive sound is not detected on July 4th, etc.), the safety monitor 110A also generates a safety alert (also block 1102). In addition, the safety monitor 110A transmits the current usage attributes corresponding to the detection of the concussive sound, location information and information indicating that a corresponding safety alert was generated to the remote safety manager 130 (block 1104). The safety monitor 110A may additionally supply any other information to the remote safety manager 130. In response to receiving the information from the safety monitor 110A (block 1106), the remote safety manager 130 identifies other portable electronic devices (e.g., the second portable electronic device 120B, the third portable electronic device 120C) located near the first portable electronic device 110A (block 1108). In some examples, other portable electronic devices near the first portable electronic device can include other portable electronic devices at a same location as the first portable electronic device, within a threshold distance of the first portable electronic device, at a same venue as the first portable electronic device, within a same building, etc. If the nearby portable electronic devices (e.g., the second portable electronic device 120B, the third portable electronic device 120C) have not generated a safety alert, the remote safety manager 130 may attempt to query the second and third safety monitors 110B, 110C to determine whether the corresponding users 150B, 150C are affected by the explosion and require assistance. If the corresponding first and second users 150B, 150C respond in the affirmative or do not respond at all due to, for example, a loss of connectivity, the remote safety manager 130 actuates safety alerts on behalf of the second and third users (block 1110), and the program 1100 ends.

Referring to FIG. 12, the program 1200 begins at a block 1202 at which the example safety monitor 110A (see FIG. 1 and FIG. 2) detects a concussive sound of a decibel level that is typically associated with detonation of an explosive device. Assuming the usage context is such that a concussive alert can be (but is not necessarily) evidence of danger to the user 150A (e.g., the user is at an entertainment venue), the safety monitor 110A initially generates a safety alert. In addition, the safety monitor 110A transmits the current usage attributes corresponding to the detection of the concussive sound, location information, and information indicating that a corresponding safety alert was generated to the remote safety manager 130 (block 1204). The safety monitor 110A may additionally supply any other information to the remote safety manager 130. In response to receiving the information from the safety monitor 110A ((block 1206), the remote safety manager 130 identifies other portable electronic devices (e.g., the second portable electronic device 120B, the third portable electronic device 120C) located near the first portable electronic device 110A (block 1208). In addition, the remote safety manager 130 searches the external data sources 145 for contextual information that might explain the concussive sound (block 1210). In some examples, the safety manager 130 determines, when searching, that one or more of the nearby users has posted evidence online (e.g., Facebook, snapchat, Instagram) that they are witnessing a fireworks display. In some examples, the remote safety manager 130 determines that a venue at which the users are located is hosting a rock band that uses pyrotechnics. In some such examples, the remote safety manager 130 may query the users via the portable electronic devices 120B, 120C to confirm that the concussive sound is benign (also block 1210). Depending on the type of contextual information received in response to the searching and querying, the remote safety manager 130 actuates a safety alert for the second and third safety monitors 110B, 110C or cancels the safety alert generated by the first safety monitor 110A (block 1212). Thereafter the program ends.

As described above, the safety system 100 of FIGS. 1-3 monitor can be used to monitor the health and safety of a user. In some examples, the safety system 100 can further be used by a parent to track children and, when the system detects that a child is in distress, outside of a defined boundary and/or otherwise in need of assistance, the either the child or parent may then actuate a safety alert. Further, the safety system 100 may be used in the entertainment industry to gauge the reaction of an audience to a horror movie, for example. The system can track of audience members physical responses to the movie and detected cues that indicate the user if frightened (e.g., the user gripped an arm of a chair, the user jumped, the user screamed, etc.). The system can also be used in a large lecture room to track the response of students during a lecture. If the system determines that an audience member has not engaged/alert, the system can alert the lecturer who can choose to wake them up by sending a notification. Other such example implementations will be apparent to one of ordinary skill in the art.

Figure 13:
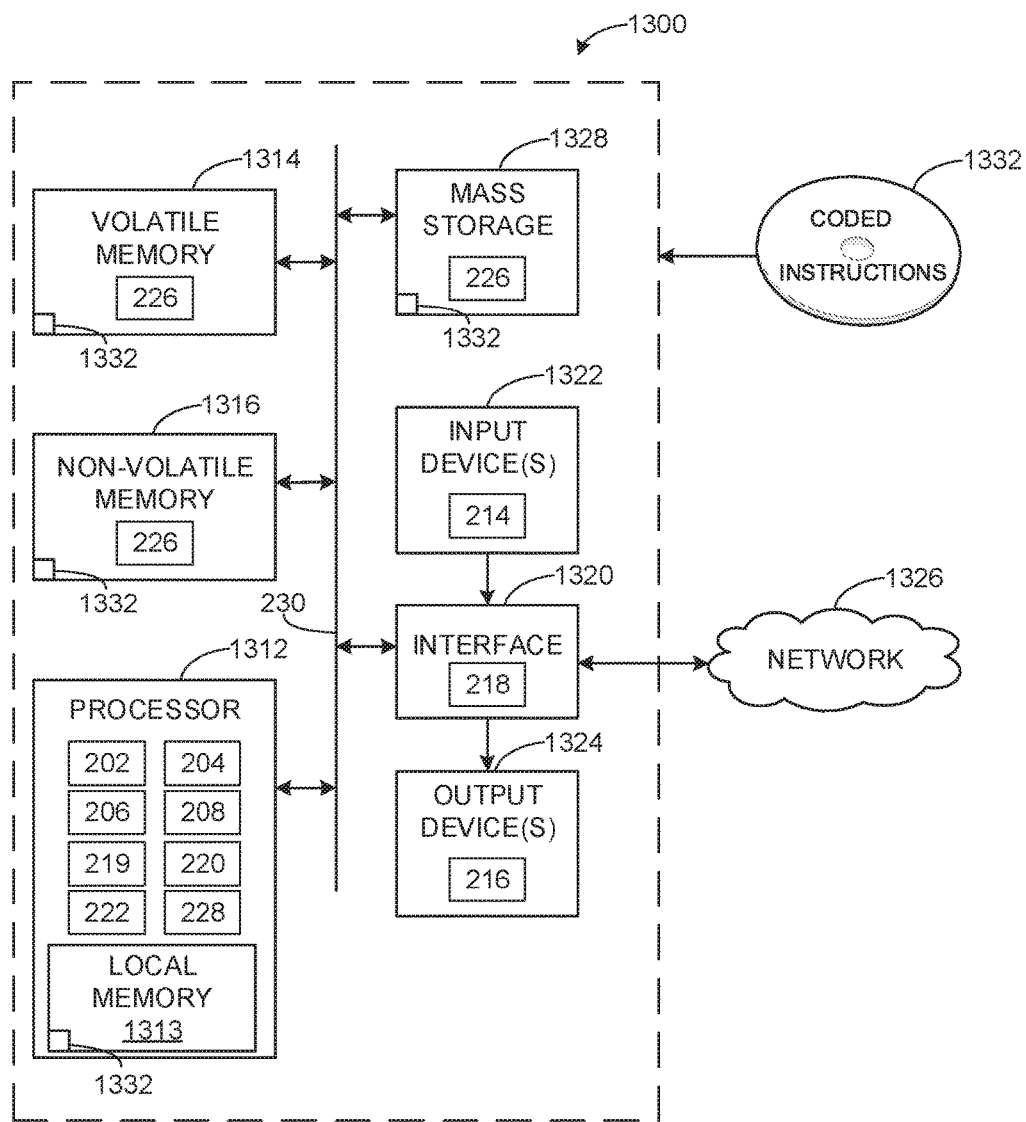
FIG. 13 is a block diagram of an example processor platform capable of executing the instructions of FIGS. 4-9, 11 and 12 to implement the example safety monitor of FIG. 1, and FIG. 2.

FIG. 13 is a block diagram of an example processor platform 1300 capable of executing the instructions of FIGS. 3-9, 11, and 12 to implement any of the example first, second and third safety monitors 110A of FIGS. 1 and 2. The processor platform 1300 can be, for example, a server, a personal computer, a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The hardware processor may be a semiconductor based (e.g., silicon based) device. In this example, the processor implements the example current usage detector 220, the example threshold alert level adjuster 221, the example past history usage analyzer 222, the example threshold alert level monitor 202, the example safety alert actuator 204, the example false alarm evaluator 208, the example threshold override device 228, the example communication controller 219, and the example usage context generator 206.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller. The example main memory 1314, 1316 implements the example usage context profile storage 226.

The processor platform 1300 of the illustrated example also includes an interface circuit 1320. The interface circuit 1320 may be implemented by any type of interface standard, such as an Ethernet interface, a universal serial bus (USB), and/or a PCI express interface. In this example, the interface circuit 1320 implements the example first interface bus 230.

In the illustrated example, one or more input devices 1322 are connected to the interface circuit 1320. The input device(s) 1322 permit(s) a user to enter data and/or commands into the processor 1312 and further permit data to be sensed. The input device(s) can be implemented by, for example, an audio sensor, a microphone, a camera (still or video), a keyboard, a button, a mouse, a touchscreen, a track-pad, a trackball, isopoint and/or a voice recognition system. The input device(s) 1332 implements the example user input devices 214 and the example sensor(s) 210.

One or more output device(s) 1324 are also connected to the interface circuit 1320 of the illustrated example. The output device(s) 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor. The output device(s) 1324 implement the example output devices 216.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.). The interface circuit 1320 implements the example communication devices 218.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The mass storage device(s) 1328 can implement the usage context profile storage 226.

The coded instructions 1332 of FIGS. 3-9, 11 and 12 may be stored in the mass storage device 1328, in the volatile memory 1314, in the non-volatile memory 1316, and/or on a removable tangible computer readable storage medium such as a CD or DVD.

Figure 14:
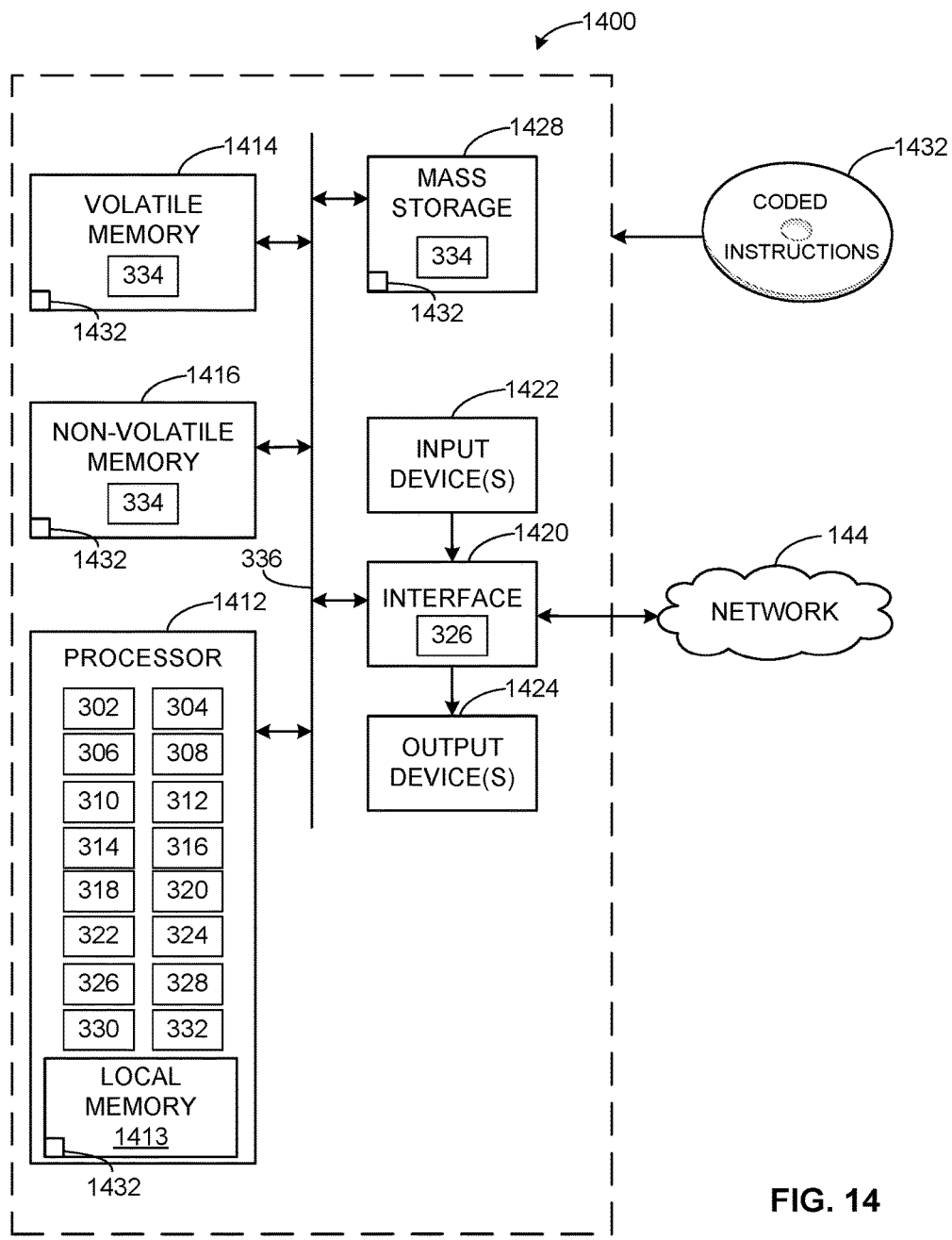
FIG. 14 is a block diagram of an example processor platform capable of executing the instructions of FIGS. 5, 7, 10, 11, and 12 to implement the example remote safety manager of FIGS. 1 and 3.

FIG. 14 is a block diagram of an example processor platform 1400 capable of executing the instructions of FIGS. 5, 7, 10, 11, and 12 to implement the example remote safety manager 130 of FIGS. 1 and 3. The processor platform 1400 can be, for example, a server, a personal computer, a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The hardware processor may be a semiconductor based (e.g., silicon based) device. In this example, the processor implements the example past usage history collector 302, the example supplemental past usage history analyzer 304, the example current usage data collector 306, the example current usage data analyzer 308, the example portable device query engine 310, the example remote threshold alert level adjuster 311, the example remote threshold alert level monitor 312, the example remote safety alert actuator 314, the example external source data collector 316, the example external data source analyzer 318, the example real-time event analyzer 320, the example assistance request manager 322, the example communication network data collector 324, the example communication controller 326, the example context usage history collector 328, the example supplemental context usage history analyzer 330, the example usage context profile collector/analyzer 332.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller. In this example, the main memory 1414, 1416 implements the storage(s) 334.

The processor platform 1400 of the illustrated example also includes an interface circuit 1420. The interface circuit 1420 may be implemented by any type of interface standard, such as an Ethernet interface, a universal serial bus (USB), and/or a PCI express interface. The interface circuit 1420 implements the example second interface bus 336.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) 1422 can implement any of a set of input devices that can be added to the remote safety manager 130 to permit system configuration, data entry, system maintenance, system control, etc.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.). In this example, the interface circuit 1420 implements the example communication controller 326.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives. In this example, the mass storage device(s) 1428 implement the example storage(s) 334.

The coded instructions 1432 of FIGS. 5, 7, 10, 11, and 12 may be stored in the mass storage device 1428, in the volatile memory 1414, in the non-volatile memory 1416, and/or on a removable tangible computer readable storage medium such as a CD or DVD.

From the foregoing, it will be appreciated that example methods, apparatus and articles of manufacture have been disclosed that automatically summon assistance on behalf of a user when an abnormal activity associated with a threat to the safety and/or health of the user has been detected. Further, the disclosed methods, apparatus and articles of manufacture include machine learning technology that learns one or more routines of the user 150A and uses the learned routine information to better define the activities considered to be abnormal and to limit the detection of false alarms. Thus, the methods, apparatus and articles of manufacture disclosed herein, by eliminating the need for a user of a portable electronic device to take manual action to summon assistance, thereby enhancing the user's ability to obtain assistance when needed.

The following further examples are disclosed herein.

Example 1 is a safety monitor for use in a portable electronic device. The safety monitor of example 1 includes a usage context analyzer to determine a usage context in which the portable electronic device is used, the usage context determined based on a history of past usage information; a current usage detector to determine whether the portable electronic device is being used in the usage context at a current time, and, when the portable electronic device is determined to be used in the usage context at the current time, obtain a threshold alert level corresponding to the usage context, the threshold alert level indicating a degree of danger to which a user of the portable electronic device is exposed; a threshold alert level monitor to determine whether the threshold alert level has been satisfied; and a safety alert actuator to actuate an output device of the portable electronic device when the threshold alert level is determined to be satisfied Example 2 includes the subject matter of Example 1, wherein the actuation of the output device includes causing the output device to notify a third party that the user requires assistance.

Example 3 includes the subject matter of Example 1, wherein the usage context analyzer is further to identify a daily routine of the user, the usage context analyzer to use the daily routine to determine the usage context.

Example 4 includes the subject matter of Example 1 or example 3, wherein the usage context analyzer is to generate a usage context profile corresponding to the usage context, the usage context profile including the threshold alert level, a set of first usage attributes and a set of second usage attributes.

Example 5 includes the subject matter of Example 4, wherein the current usage detector is to determine the portable electronic device is being used in the usage context by monitoring information associated with the portable electronic device to identify current usage attributes, and determining whether a threshold number of the current usage attributes are included among the first usage attributes.

Example 6 includes the subject matter of Example 4, wherein the second usage attributes, when detected, indicate that the portable electronic device is experiencing abnormal activity, the abnormal activity being associated with potential threat to the user.

Example 7 includes the subject matter of Example 6, wherein the abnormal activity includes the portable electronic device being one of dropped or thrown, and a corresponding one of the second attributes is obtained based on information supplied by a motion detector of the portable electronic device.

Example 8 includes the subject matter of Example 6, wherein the abnormal activity includes being gripped by the user with more than a threshold amount of force, and a corresponding one of the second attributes is obtained based on information supplied by a pressure sensor.

Example 9 includes the subject matter of Example 8, wherein the pressure sensor is carried by a carrying case, the carrying case is in physical contact with the portable electronic device, and the pressure sensor communicates information to the portable electronic device for usage by the threshold alert level monitor.

Example 10 includes the subject matter of Example 1, wherein the usage context is further determined based on data received from a remote safety manager, the data including information regarding a region within which the portable electronic device is currently located.

Example 11 includes the subject matter of Example 1, wherein the usage context is further determined based on data received from a remote safety manager, the data including information regarding environmental factors of a region within which the portable electronic device is currently located.

Example 12 includes the subject matter of any of Examples 1, 10 or 11, wherein the portable electronic device includes a transmitter, the transmitter to transmit past usage history collected at the portable electronic device to a remote processor, the remote processor to analyze the information to revise the usage context based on information obtained from one of a public, private and governmental information service.

Example 13 includes the subject matter of Example 1, wherein the threshold alert is a first threshold alert level and the safety monitor further includes a threshold alert level override, the threshold alert level override to cause the threshold alert level monitor to replace the first threshold alert level with a second threshold alert level based on a user input.

Example 14 includes one or more non-transitory machine-readable storage media including machine-readable instructions that, when executed, cause at least one processor of a portable electronic device to at least: determine a usage context in which the portable electronic device is used, the usage context determined based on a history of past usage information; determine whether the portable electronic device is being used in the usage context at a current time, and, when the portable electronic device is determined to be used in the usage context at the current time, obtain a threshold alert level corresponding to the usage context, the threshold alert level indicating a level of danger to which a user of the portable electronic device is exposed; determine whether the threshold alert level has been satisfied; and actuate an output device when the threshold alert level is determined to be satisfied.

Example 15 includes the subject matter of Example 14, wherein the actuation of the output device includes causing the output device to transmit a message to a third party, the message to request assistance from the third party.

Example 16 includes the subject matter of Example 14, and further includes instructions to cause the at least one processor to identify a daily routine of the user, the usage context analyzer to use the daily routine to determine the usage context.

Example 17 includes the subject matter of Example 14 or example 16, and further includes instructions to cause the at least one processor to generate a usage context profile corresponding to the usage context, the usage context profile including the threshold alert level, a set of first usage attributes, and a set of second usage attributes.

Example 18 includes the subject matter of Example 17, and further includes instructions to cause the at least one processor to determine the portable electronic device is being used in the usage context by monitoring information associated with the portable electronic device to identify current usage attributes, and determining whether a threshold number of the current usage attributes are included among the first usage attributes.

Example 19 includes the subject matter of Example 17, wherein the second usage attributes, when detected, indicate that the portable electronic device is experiencing abnormal activity.

Example 20 includes the subject matter of Example 19, wherein the abnormal activity includes the portable electronic device being one of dropped or thrown, and a corresponding one of the second attributes is obtained based on information supplied by a motion detector of the portable electronic device.

Example 21 includes the subject matter of Example 20, wherein the abnormal activity includes being gripped by the user with more than a threshold amount of force, and a corresponding one of the second attributes is obtained based on information supplied by a pressure sensor.

Example 22 includes the subject matter of Example 21, wherein the pressure sensor is in a carrying case, the carrying case is in physical contact with the portable electronic device, and the pressure sensor communicates information to the at least one processor for usage in monitoring the threshold alert level.

Example 23 includes the subject matter of Example 14, wherein the usage context is further determined based on data received from a remote safety manager, the data including information provided by police regarding a region within which the portable electronic device is currently located.

Example 24 includes the subject matter of Example 14, wherein the usage context is further determined based on data received from a remote safety manager, the data including information regarding environmental factors of a region within which the portable electronic device is currently located.

Example 25 includes the subject matter of any one of Examples 14, 23 or 24, wherein the instructions further cause the at least one processor to cause a transmitter to transmit past usage history to a remote processor, the remote processor to analyze the information to revise the usage context based on information obtained from one of a public, private and governmental information service.

Example 26 includes the subject matter of Example 14, wherein the threshold alert is a first threshold alert level and the instructions further cause the at least one processor to respond to a user input by overriding the threshold alert level and monitoring a second threshold alert level instead of the first threshold alert level.

Example 27 is a method to summon assistance for a user of a portable electronic device. The method of Example 27 includes: determining, by executing an instruction with at least one processor, a usage context in which the portable electronic device is used, the usage context determined based on a history of past usage information; determining, by executing an instruction with at least one processor, whether the portable electronic device is being used in the usage context at a current time, and, when the portable electronic device is determined to be used in the usage context at the current time, obtaining a threshold alert level corresponding to the usage context, the threshold alert level indicating a level of danger to which a user of the portable electronic device is exposed; determining, by executing an instruction with at least one processor, whether the threshold alert level has been satisfied; and when the threshold alert level is determined to be satisfied, actuating an output device to transmit a message to a third party, the message to request the assistance of the third party on behalf of the user.

Example 28 includes the subject matter of Example 27, and further includes identifying a daily routine of the user, and using the daily routine to determine the usage context.

Example 29 includes the subject matter of any of Example 27 and 28, and further includes generating a usage context profile corresponding to the usage context, the usage context profile including the threshold alert level, a set of first usage attributes and a set of second usage attributes.

Example 30 includes the subject matter of Example 29, wherein the determining that the portable electronic device is being used in the usage context includes monitoring information associated with the portable electronic device to identify current usage attributes, and determining whether a threshold number of the current usage attributes are included among the set of first usage attributes.

Example 31 includes the subject matter of Example 29, and further includes detecting the second usage attributes based on information supplied by the portable electronic device, the second usage attributes indicating that the portable electronic device is experiencing abnormal activity, the abnormal activity being associated with potential threat to at least one of the safety and health of the user.

Example 32 includes the subject matter of Example 31, wherein the abnormal activity includes the portable electronic device being one of dropped or thrown, and a corresponding one of the second attributes is obtained based on information supplied by a motion detector of the portable electronic device.

Example 33 includes the subject matter of Example 31, wherein the abnormal activity includes being gripped by the user with more than a threshold amount of force, and a corresponding one of the second attributes is obtained based on information supplied by a pressure sensor.

Example 34 includes the subject matter of Example 33, wherein the pressure sensor is in a carrying case, the carrying case is in physical contact with the portable electronic device, and the pressure sensor communicates information to the portable electronic device for usage by the threshold alert level monitor.

Example 35 is an apparatus including the at least one processor to implement the method of any one of Examples 27 to 34.

Example 36 is a non-transitory machine-readable storage media including machine-readable instructions that, when executed by the at least processor, cause the least one processor to implement the method of any one of Examples 27 to 34.

Example 37 is an apparatus to summon assistance for a user of a portable electronic device. The apparatus of Example 37 includes: means for determining a usage context in which the portable electronic device is used, the usage context determined based on a history of past usage information; means for determining whether the portable electronic device is being used in the usage context at a current time; means for obtaining a threshold alert level corresponding to the usage context when the portable electronic device is determined to be used in the usage context at the current time, the threshold alert level indicating a level of danger to which a user of the portable electronic device is exposed; means for determining whether the threshold alert level has been satisfied; and means for actuating an output device to transmit a message to a third party when the threshold alert level is determined to be satisfied, the message to request the assistance of the third party on behalf of the user.

Example 38 includes the subject matter of Example 37, and further includes means for identifying a daily routine of the user, and using the daily routine to determine the usage context.

Example 39 includes the subject matter of any of Examples 37 and 38, and further includes means for generating a usage context profile corresponding to the usage context, the usage context profile including the threshold alert level, a set of first usage attributes and a set of second usage attributes.

Example 40 includes the subject matter of Example 39, wherein the means for determining whether the portable electronic device is being used in the usage context include means for monitoring information associated with the portable electronic device to identify current usage attributes, and means for determining whether a threshold number of the current usage attributes are included among the set of first usage attributes.

Example 41 includes the subject matter of Example 39, and further includes means for detecting the second usage attributes based on information supplied by the portable electronic device, the second usage attributes indicating that the portable electronic device is experiencing abnormal activity, the abnormal activity being associated with potential threat to at least one of the safety and health of the user.

Example 42 includes the subject matter of Example 41, wherein the abnormal activity includes the portable electronic device being one of dropped or thrown, and a corresponding one of the second attributes is obtained based on information supplied by a motion detector of the portable electronic device.

Example 43 includes the subject matter of Example 41, wherein the abnormal activity includes being gripped by the user with more than a threshold amount of force, and a corresponding one of the second attributes is obtained based on information supplied by a pressure sensor.

Example 44 includes the subject matter of Example 43, wherein the pressure sensor is in a carrying case, the carrying case is in physical contact with the portable electronic device, and the pressure sensor communicates information to the portable electronic device for usage by the threshold alert level monitor.

Example 45 is a safety manager to manage a safety monitor of a remote portable electronic device and includes a usage context analyzer to determine a usage context in which the remote portable electronic device is used. The usage context is determined based on a history of past usage information received from the safety monitor. The safety manager also includes a current usage data analyzer to determine whether the remote portable electronic device is being used in the usage context at a current time, and, when the remote portable electronic device is determined to be used in the usage context at the current time, obtain a threshold alert level corresponding to the usage context. The threshold alert level indicates a degree of danger to which a user of the remote portable electronic device is exposed. The safety manager further includes a threshold alert level monitor to monitor the threshold alert level, and, based on the monitoring of the threshold alert level, determine whether the threshold alert level has been satisfied. Additional, the safety manager includes a safety alert that, when the threshold alert level is determined to be satisfied, actuates a safety alert. The safety alert includes at least one of notifying a third party that the user is in need of assistance and causing the safety monitor to notify the third party that the user is in need of assistance.

Example 46 includes the subject matter of Example 45. In Example 46, the notifying of the third party includes transmitting a location of the remote portable electronic device to the third party.

Example 47 includes the subject matter of Example 45 and further includes a past usage history analyzer to analyze the history of past usage information, and at least one of the past usage history analyzer, the usage context analyzer and the current usage data analyzer generates, based on at least one of the current usage data, the history of past usage information, and external source data, a usage context profile corresponding to the usage context. The usage context profile includes the threshold alert level, and a usage attribute. The usage attribute corresponds to sensor information collected at the remote portable electronic device, and the threshold alert level monitor monitors the threshold alert level by monitoring the sensor information.

Example 48 includes the subject matter of Example 45, wherein the sensor information identifies a sensor threshold value and the threshold alert level is determined to be satisfied when the sensor threshold value is satisfied.

Example 49 includes the subject matter of any of Examples 45-48, wherein the safety manager supplies the threshold alert level to the safety monitor for use in monitoring the sensor information. In Example 49, the at least one of the past usage history analyzer, the usage context analyzer, and the current usage data analyzer generate a revised threshold alert level based on at least one of the current usage data, the history of past usage information, and external source data, and the safety manager supplies the revised threshold alert level to the safety monitor for use in monitoring the sensor information.

Example 50 includes the subject matter of Example 47, wherein the usage attribute is a first usage attribute, the sensor information is first sensor information, and the usage context profile further includes a second usage attribute corresponding to second sensor information collected at the remote portable electronic device. In Example 50, the current usage data analyzer determines whether the remote portable electronic device is being used in the usage context at the current time by monitoring the second sensor information.

Example 51 includes the subject matter of any of Examples 45-46. In Example 51, the current usage data analyzer determines whether the remote portable electronic device is being used in the usage context by monitoring sensor information collected at the remote portable electronic device and by determining, based on the monitoring of the sensor information, whether the sensor information corresponds to a threshold number of current usage attributes associated with the usage context.

Example 52 includes the subject matter of any of Examples 45-48. Example 52 further includes an external source data collector to collect external source data from a plurality of external data sources. The external data sources are remote from the safety manager and include at least one of a social media service, a telecommunication network control center, a governmental law enforcement entity, a private security entity, and a commercial enterprise. Example 52 also includes an external data source analyzer to analyze the external source data and revise the threshold alert level based on the external source data.

Example 53 includes the subject matter of any of Examples 45-48. In Example 53, the threshold alert level is a first threshold alert level, and the safety manager further includes a threshold alert level adjuster. The threshold alert level adjuster replaces the first threshold alert level with a second threshold alert level in response to at least one of sensed information collected at the remote portable electronic device, and external source data from an external data source.

Example 54 includes the subject matter of Example 53. In Example 54, the second threshold alert level is associated with a higher degree of danger than the first threshold alert level, and the second threshold alert level is associated with a lower threshold that the first threshold alert level.

Example 55 includes the subject matter of any of Examples 45-48. In Example 55, the current usage data analyzer causes the threshold alert level to be stored at the remote safety monitor, and the safety manager further includes a threshold alert level adjuster that revises the threshold alert level stored at the remote safety monitor in response to at least one of sensed information collected at the remote portable electronic device, and external source data from an external data source.

Example 56 includes the subject matter of any of Examples 45-48, wherein the safety alert actuator is further to actuate an output device of the remote portable electronic device when the threshold alert level is determined to be satisfied.

Example 57 includes the subject matter of Example 56. In Example 57, the remote portable electronic device is a first remote portable electronic device, the output device is a first output device, and the safety alert actuator actuates a second output device of a second remote portable electronic device located within a threshold distance of the first remote portable electronic device when the threshold alert level is determined to be satisfied.

Example 58 includes the subject matter of any of Examples 45-48. In Example 58, the safety manager further includes an assistance request manager to request control of a remote surveillance device when the remote portable electronic device comes within a threshold distance of the remote surveillance device.

Example 59 includes the subject matter of any of Examples 45-48. In Example 59, the safety alert actuator controls a remote surveillance device located within a threshold distance of the remote portable electronic device when the threshold alert level is determined to be satisfied.

Example 60 includes the subject matter of any of Examples 45-48, wherein the safety alert actuator is further to actuate an audio emitting device located within a threshold distance of the remote portable electronic device when the threshold alert level is determined to be satisfied.

Example 61 includes one or more non-transitory machine-readable storage media having machine-readable instructions that, when executed, cause at least one processor to at least identify a threshold alert level corresponding to a context in which a remote portable electronic device is being used. The threshold alert level indicates a degree of danger to which a user of the remote portable electronic device is exposed and the remote portable electronic device is remote from the at least one processor. The instructions further cause the at least one processor to determine whether the threshold alert level is satisfied, and, based on whether the threshold alert level is satisfied, notify a third party that the user of the remote portable electronic device is in need of assistance.

Example 62 includes the subject matter of Example 61. In Example 62, the instructions further cause the at least one processor to analyze at least one of usage data collected at the remote portable electronic device, and external source data to generate a usage context profile corresponding to the context in which the remote portable electronic device is being used. The usage context profile includes the threshold alert level, and sensor information corresponding to the threshold alert level.

Example 63 includes the subject matter of Example 61. In Example 63, the sensor information includes a sensor threshold value and the threshold alert level is determined to be satisfied when the sensor threshold value is satisfied.

Example 64 includes the subject matter of Example 61. In Example 64, the instructions further cause the at least one processor to supply the threshold alert level to a safety monitor of the remote portable electronic device for use in determining when the sensor threshold value is satisfied.

Example 65 includes the subject matter of any of Examples 61-64. In Example 65, the instructions further cause the at least one processor to generate the threshold alert level based on an analysis of usage data associated with usage of the remote portable electronic device.

Example 66 includes the subject matter of any of Examples 61-64. In Example 66, the instructions further cause the at least one processor to generate an upgraded threshold alert level based on external source data corresponding to an event occurring within a threshold distance of the remote portable electronic device.

Example 67 includes the subject matter of Example 66. In Example 67, the remote portable electronic device is a first remote portable electronic device, and the external source data is supplied by a second remote portable electronic device located within a threshold distance of the first remote portable electronic device.

Example 68 includes the subject matter of any of Examples 61-64. In Example 68, the instructions further cause the at least one processor to analyze external source data collected from a plurality of external data sources, the external data sources including at least one of a social media service, a telecommunication network control center, a governmental law enforcement entity, and a private security entity, and adjust the threshold alert level based on the external source data.

Example 69 includes the subject matter of any of Examples 61-64. In Example 69, the instructions further cause the at least one processor to identify the threshold alert level corresponding to the context by accessing a usage context profile. The usage context profile includes the threshold alert level and a set of usage attributes. The usage attributes, when detected, indicate the remote portable electronic device is being used in the context.

Example 70 includes the subject matter of Example 69. In Example 69, the instructions further cause the at least one processor to determine the context in which the remote portable electronic device is being used by monitoring a set of sensors associated with the usage attributes.

Example 71 includes the subject matter of any of Examples 61-64. In Example 71, the instructions further cause the at least one processor to adjust the threshold alert level in response to at least one of sensed information collected at the remote portable electronic device, and external source data from an external data source. At least one of the sensed information and the external source data indicate the degree of danger to which the user is exposed has changed.

Example 72 includes the subject matter of Example 71. In Example 71, the adjusting of the threshold alert level includes lowering the threshold alert level when the degree of danger has increased and raising the threshold alert level when the degree of danged has decreased.

Example 73 includes the subject matter of any of Examples 61-64. In Example 73, the instructions further cause the at least one processor to actuate an output device of the remote portable electronic device when the threshold alert level is determined to be satisfied.

Example 74 includes the subject matter of Example 73. In Example 74, the remote portable electronic device is a first remote portable electronic device, the output device is a first output device, and the instructions further cause the at least one processor to actuate a second output device of a second remote portable electronic device. The second remote portable electronic device is located within a threshold distance of the first remote portable electronic device when the threshold alert level is determined to be satisfied.

Example 75 includes the subject matter of any of Examples 61-64. In Example 75, the instructions further cause the at least one processor to request control of a remote surveillance device when the remote portable electronic device comes within a threshold distance of the remote surveillance device.

Example 76 includes the subject matter of any of Examples 61-64. In Example 76, the instructions further cause the at least one processor to control a remote surveillance device located within a threshold distance of the remote portable electronic device when the threshold alert level is determined to be satisfied.

Example 77 includes the subject matter of Example 61-64. In Example 77, the instructions further cause the at least one processor to actuate an audio emitting device located within a threshold distance of the remote portable electronic device when the threshold alert level is determined to be satisfied.

Example 78 is a method to monitor the safety of a user of a remote portable electronic device. The method of Example 78 includes identifying a threshold alert level corresponding to a context in which a remote portable electronic device is being used. The threshold alert level indicates a degree of danger to which a user of the remote portable electronic device is exposed. The method also includes determining whether the threshold alert level is satisfied, and, based on whether the threshold alert level is satisfied, notifying a third party that the user of the remote portable electronic device is in need of assistance.

Example 79 includes the subject matter of Example 78. The method of Example 79 further includes generating a usage context profile based on an analysis of at least one of usage data collected at the remote portable electronic device, and external source data. The usage context profile corresponds to the context in which the remote portable electronic device is being used, and includes the threshold alert level, and sensor information corresponding to the threshold alert level.

Example 80 includes the subject matter of Example 79. In Example 80, the sensor information includes a sensor threshold value and the threshold alert level is determined to be satisfied when the sensor threshold value is satisfied.

Example 81 includes the subject matter of Example 80. The method of Example 81 includes supplying the threshold alert level to the remote portable electronic device for use in monitoring a sensor to determine when the sensor threshold value is satisfied.

Example 82 includes the subject matter of any of Examples 78-81. The method of Example 82 includes generating the threshold alert level based on an analysis of usage data associated with usage of the remote portable electronic device.

Example 83 includes the subject matter of any of Examples 78-81. The method of Example 83 includes generating an upgraded threshold alert level based on external source data corresponding to an event occurring within a threshold distance of the remote portable electronic device.

Example 84 includes the subject matter of Example 83. In the method of Example 84, the remote portable electronic device is a first remote portable electronic device, and the external source data is supplied by a second remote portable electronic device located within a threshold distance of the first remote portable electronic device.

Example 85 includes the subject matter of any of Examples 78-81. The method of Example 85 further includes analyzing external source data collected from a plurality of external data sources, the external data sources including at least one of a social media service, a telecommunication network control center, a governmental law enforcement entity, a private security entity, and a commercial enterprise, and also includes adjusting the threshold alert level based on the external source data.

Example 86 includes the subject matter of any of Examples 78-81. The method of Example 86 also includes identifying the threshold alert level corresponding to the context by accessing a usage context profile. The usage context profile includes a set of usage attributes that, when detected, indicate the remote portable electronic device is being used in the context.

Example 87 includes the subject matter of Example 86. The method of Example 86 further includes determining the context in which the remote portable electronic device is being used by monitoring a set of sensors associated with the usage attributes.

Example 88 includes the subject matter of Example 85. In the method of Example 88, the adjusting of the threshold alert level occurs in response to sensed information collected at the remote portable electronic device, and the external source data from the external data source. At least one of the sensed information and the external source data indicates that the degree of danger to which the user is exposed has changed.

Example 89 includes the subject matter of any of Examples 85 and 88. In the method of Example 89, the adjusting of the threshold alert level includes lowering the threshold alert level when the degree of danger has increased and raising the threshold alert level when the degree of danged has decreased.

Example 90 includes the subject matter of any of Examples 78-81. The method of Example 90 further includes, when the threshold alert level is determined to be satisfied, actuating an output device of the remote portable electronic device.

Example 91 includes the subject matter of Examples 90. In the method of Example 91, the remote portable electronic device is a first remote portable electronic device, the output device is a first output device, and the method further includes, when the threshold alert level is determined to be satisfied, actuating a second output device of a second remote portable electronic device. The second remote portable electronic device is located within a threshold distance of the first remote portable electronic device when the threshold alert level is determined to be satisfied.

Example 92 includes the subject matter of any of Examples 78-81. The method of Example 92 further includes requesting control of a remote surveillance device when the remote portable electronic device comes within a threshold distance of the remote surveillance device.

Example 93 includes the subject matter of any of Examples 78-81. The method of Example 93 further includes, when the threshold alert level is determined to be satisfied, controlling a remote surveillance device. The remote surveillance device is located within a threshold distance of the remote portable electronic device when the threshold alert level is determined to be satisfied.

Example 94 includes the subject matter of any of Examples 78-81. The method of Example 94 further includes, when the threshold alert level is determined to be satisfied, actuating an audio emitting device. The audio emitting device is located within a threshold distance of the remote portable electronic device when the threshold alert level is determined to be satisfied.

Example 95 is a machine readable medium including code, when executed to cause a machine to perform the method of any one of Examples 78-94.

Example 96 is an apparatus comprising means to perform the method of any of Examples 78-94.

Example 97 is a machine readable storage including machine readable instructions. The instructions, when executed, implement the method of any of Examples 78-94 or realize the apparatus of any of Examples 45-60.

Example 98 is a safety monitor to monitor the safety of a user of a remote portable electronic device. The safety monitor of Example 98 includes means to determine a usage context in which the remote portable electronic device is used. The usage context is determined based on a history of past usage information received from the remote portable electronic device. The safety monitor also includes means to determine whether the remote portable electronic device is being used in the usage context at a current time, and, when the remote portable electronic device is determined to be used in the usage context at the current time, obtain a threshold alert level corresponding to the usage context. The threshold alert level indicates a degree of danger to which a user of the remote portable electronic device is exposed. The safety monitor further includes means to monitor the threshold alert level, and, based on the monitoring of the threshold alert level, determine whether the threshold alert level has been satisfied. The safety monitor also includes means to notify a third party that the user is in need of assistance when the threshold alert level is determined to be satisfied.

Example 99 includes the subject matter of Example 98. In Example 99, the means to notify cause a location of the remote portable electronic device to be transmitted to the third party.

Example 100 includes the subject matter of Example 98. In Example 100, the safety monitor further includes means to analyze the history of past usage information, current usage information, and external source data to generate a usage context profile corresponding to the usage context. The usage context profile includes the threshold alert level, and a usage attribute corresponding to sensor information collected at the remote portable electronic device. The means to monitor the threshold alert level monitors the threshold alert level by monitoring the sensor information.

Example 101 includes the subject matter of Example 100. In Example 101, the sensor information identifies a sensor threshold value and the threshold alert level is determined to be satisfied when the sensor threshold value is satisfied.

Example 102 includes the subject matter of Example 98. The safety monitor of Example 102 further includes means to transmit the usage context profile to the remote portable electronic device for use in monitoring the sensor information. The means to analyze generates a revised threshold alert level and revised sensor information based on at least one of the current usage information, the history of past usage information and the external source data. The means to transmit transmits the revised threshold alert level and revised sensor information to the remote portable electronic device for use in monitoring the revised threshold alert level.

Example 103 includes the subject matter of Example 102. In Example 103, the external source data include real-time event data, and the means to analyze is to generate the revised threshold alert level based on the real-time event data.

Example 104 includes the subject matter of Example 103. In Example 104, the remote portable electronic device is a first remote portable electronic device, the external source data is supplied by a second remote portable electronic device, and the real-time event data corresponds to a real-time event occurring within a threshold distance of the first remote portable electronic device and the second remote portable electronic device.

Example 105 includes the subject matter of any of Examples 100 and 101. In Example 105, the usage attribute is a first usage attribute, the sensor information is first sensor information, the usage context profile further includes a second usage attribute corresponding to second sensor information collected at the remote portable electronic device. In Example 105, the means to analyze is to determine whether the remote portable electronic device is being used in the usage context at the current time by monitoring the second sensor information.

Example 106 includes the subject matter of any of Examples 98 and 99. In Example 106, the safety monitor further includes means to collect external source data from a plurality of external data sources. The external data sources are remote from the remote portable electronic device and the safety monitor and the external data sources include at least one of a social media service, a telecommunication network control center, a governmental law enforcement entity, a private security entity, and a commercial enterprise. In Example 106, the safety monitor further includes means to analyze the external source data. The means to analyze the external source data also revises the threshold alert level based on the external source data.

Example 107 includes the subject matter of Example 98. The safety monitor of Example 107 further includes means to monitor sensor information collected at the remote portable electronic device, and, means to determine whether the sensor information corresponds to a threshold number of current usage attributes associated with the usage context.

Example 108 includes the subject matter of any of Examples 106. In Example 108, the threshold alert level is a first threshold alert level. The safety monitor of Example 108 further includes means to adjust the threshold alert level. The means to adjust the threshold alert level replace the first threshold alert level with a second threshold alert level in response to at least one of the sensor information, and the external source data from the external data source.

Example 109 includes the subject matter of Example 108. In Example 108, the second threshold alert level is associated with a higher degree of danger than the first threshold alert level, and the second threshold alert level is associated with a lower threshold that the first threshold alert level.

Example 110 includes the subject matter of any of Examples 108 and 109. In Example 110, the threshold alert level is stored at the safety monitor and at the remote portable electronic device, and the means to adjust the threshold alert level is to adjust the threshold alert level stored at the safety monitor and stored at the remote portable electronic device.

Example 111 includes the subject matter of any of Examples 98-104. In Example 111, the safety monitor further includes means to actuate an output device of the remote portable electronic device when the threshold alert level is determined to be satisfied.

Example 112 includes the subject matter Example 111. In Example 112, the remote portable electronic device is a first remote portable electronic device, the output device is a first output device, and the means to actuate is further to actuate, when the threshold alert level is determined to be satisfied, a second output device of a second remote portable electronic device. The second remote portable electronic device is located within a threshold distance of the first remote portable electronic device when the threshold alert level is determined to be satisfied.

Example 113 includes the subject matter of any of Examples 98-104. In Example 113, the safety monitor further includes means to request control of a remote surveillance device when the remote portable electronic device comes within a threshold distance of the remote surveillance device.

Example 114 includes the subject matter of any of Examples 98-104. In Example 114, the safety monitor further includes means to control a remote surveillance device located within a threshold distance of the remote portable electronic device when the threshold alert level is determined to be satisfied.

Example 115 includes the subject matter of any of Examples 98-104. In Example 115, the safety monitor further includes means to actuate an audio emitting device located within a threshold distance of the remote portable electronic device when the threshold alert level is determined to be satisfied.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A safety monitor for use in a portable electronic device, the safety monitor comprising:
   a usage context analyzer to determine a usage context in which the portable electronic device is currently being used by the user, the usage context determined based on a history of past usage information;
   a current usage detector to determine whether the portable electronic device is being used in the usage context at a current time, and, when the portable electronic device is determined to be used in the usage context at the current time, obtain a threshold alert level corresponding to the usage context, the threshold alert level indicating a degree of danger to which a user of the portable electronic device is exposed;
   a real time event analyzer to adjust the threshold alert level based on a real-time event happening at a location associated with the portable electronic device;
   a threshold alert level monitor to determine whether the threshold alert level has been satisfied; and
   a safety alert actuator to actuate an output device of the portable electronic device when the threshold alert level is determined to be satisfied.

2. The safety monitor of claim 1, wherein the actuation of the output device includes causing the output device to notify a third party that the user requires assistance.

3. The safety monitor of claim 1, wherein the usage context analyzer is further to identify a daily routine of the user, the usage context analyzer to use the daily routine to determine the usage context.

4. The safety monitor of claim 1, wherein the usage context analyzer is to generate a usage context profile corresponding to the usage context, the usage context profile including the threshold alert level, a set of first usage attributes and a set of second usage attributes.

5. The safety monitor of claim 4, wherein the current usage detector is to determine the portable electronic device is being used in the usage context by monitoring information associated with the portable electronic device to identify current usage attributes, and determining whether a threshold number of the current usage attributes are included among the first usage attributes.

6. The safety monitor of claim 4, wherein the second usage attributes, when detected, indicate that the portable electronic device is experiencing abnormal activity, the abnormal activity being associated with potential threat to the user.

7. The safety monitor of claim 6, wherein the abnormal activity includes the portable electronic device being one of dropped or thrown, and a corresponding one of the second attributes is obtained based on information supplied by a motion detector of the portable electronic device.

8. The safety monitor of claim 6, wherein the abnormal activity includes being gripped by the user with more than a threshold amount of force, and a corresponding one of the second attributes is obtained based on information supplied by a pressure sensor.

9. The safety monitor of claim 8, wherein the pressure sensor is carried by a carrying case, the carrying case is in physical contact with the portable electronic device, and the pressure sensor communicates information to the portable electronic device for usage by the threshold alert level monitor.

10. The safety monitor of claim 1, wherein the usage context is further determined based on data received from a remote safety manager, the data including information regarding a region within which the portable electronic device is currently located.

11. The safety monitor of claim 1, wherein the usage context is further determined based on data received from a remote safety manager, the data including information regarding environmental factors of a region within which the portable electronic device is currently located.

12. The safety monitor of claim 1, wherein the portable electronic device includes a transmitter, the transmitter to transmit past usage history collected at the portable electronic device to a remote processor, the remote processor to analyze the information to revise the usage context based on information obtained from one of a public, private and governmental information service.

13. The safety monitor of claim 1, wherein the threshold alert is a first threshold alert level and the safety monitor further includes a threshold alert level override, the threshold alert level override to cause the threshold alert level monitor to replace the first threshold alert level with a second threshold alert level based on a user input.

14. One or more non-transitory machine-readable storage media comprising machine-readable instructions that, when executed, cause at least one processor of a portable electronic device to at least:
   determine a usage context in which the portable electronic device is currently being used, the usage context determined based on a history of past usage information;
   determine whether the portable electronic device is being used in the usage context at a current time, and, when the portable electronic device is determined to be used in the usage context at the current time, obtain a threshold alert level corresponding to the usage context, the threshold alert level indicating a level of danger to which a user of the portable electronic device is exposed;
   adjust the threshold alert level based on a real-time event happening at a location associated with the portable electronic device;
   determine whether the threshold alert level has been satisfied; and
   actuate an output device when the threshold alert level is determined to be satisfied.

15. The one or more non-transitory machine-readable storage media of claim 14, wherein to actuate the output device the instructions cause the output device to transmit a message to a third party, the message to request assistance from the third party.

16. The one or more non-transitory machine-readable storage media of claim 14, further including instructions to cause the at least one processor to identify a daily routine of the user, the usage context analyzer to use the daily routine to determine the usage context.

17. The one or more non-transitory machine-readable storage media of claim 14, further including instructions to cause the at least one processor to generate a usage context profile corresponding to the usage context, the usage context profile including the threshold alert level, a set of first usage attributes, and a set of second usage attributes.

18. The one or more non-transitory machine-readable storage media of claim 17, further including instructions to cause the at least one processor to determine the portable electronic device is being used in the usage context by monitoring information associated with the portable electronic device to identify current usage attributes, and determining whether a threshold number of the current usage attributes are included among the first usage attributes.

19. The one or more non-transitory machine-readable storage media of claim 17, wherein the second usage attributes, when detected, indicate that the portable electronic device is experiencing abnormal activity.

20. The one or more non-transitory machine-readable storage media of claim 19, wherein the abnormal activity includes the portable electronic device being one of dropped or thrown, and a corresponding one of the second attributes is obtained based on information supplied by a motion detector of the portable electronic device.

21. The one or more non-transitory machine-readable storage media of claim 20, wherein the abnormal activity includes being gripped by the user with more than a threshold amount of force, and a corresponding one of the second attributes is obtained based on information supplied by a pressure sensor.

22. The one or more non-transitory machine-readable storage media of claim 21, wherein the pressure sensor is in a carrying case, the carrying case is in physical contact with the portable electronic device, and the pressure sensor communicates information to the at least one processor for usage in monitoring the threshold alert level.

23. The one or more non-transitory machine-readable storage media of claim 14, wherein the instructions cause the at least one processor to determine the usage context based on data received from a remote safety manager, the data including information provided by police regarding a region within which the portable electronic device is currently located.

24. The one or more non-transitory machine-readable storage media of claim 14, wherein the instructions cause the at least one processor to determine the usage context based on data received from a remote safety manager, the data including information regarding environmental factors of a region within which the portable electronic device is currently located.

25. The one or more non-transitory machine-readable storage media of claim 14, wherein the instructions further cause the at least one processor to cause a transmitter to transmit past usage history to a remote processor, the remote processor to analyze the information to revise the usage context based on information obtained from one of a public, private and governmental information service.

* * * * *